(12) United States Patent
Bai et al.

(10) Patent No.: US 12,498,896 B2
(45) Date of Patent: Dec. 16, 2025

(54) PROJECTION METHOD AND SYSTEM, AND DEVICE

(71) Applicant: Huawei Technologies Co., Ltd., Shenzhen (CN)

(72) Inventors: Lu Bai, Wuhan (CN); Shiyao Hu, Wuhan (CN); Huaxiang Zhang, Wuhan (CN); Zhipeng Wu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/694,659

(22) PCT Filed: Aug. 24, 2022

(86) PCT No.: PCT/CN2022/114628
§ 371 (c)(1),
(2) Date: Mar. 22, 2024

(87) PCT Pub. No.: WO2023/045687
PCT Pub. Date: Mar. 30, 2023

(65) Prior Publication Data
US 2024/0319953 A1 Sep. 26, 2024

(30) Foreign Application Priority Data
Sep. 27, 2021 (CN) .......................... 202111157748.9

(51) Int. Cl.
*G06F 3/14* (2006.01)
*G06F 16/438* (2019.01)
(Continued)

(52) U.S. Cl.
CPC .......... *G06F 3/1454* (2013.01); *G09B 5/065* (2013.01); *G06F 3/04847* (2013.01);
(Continued)

(58) Field of Classification Search
CPC ............... G06F 3/1454; G06F 16/4393; G06F 3/04847; G09B 5/065; H04N 21/8586;
(Continued)

(56) References Cited

U.S. PATENT DOCUMENTS

2013/0033435 A1* 2/2013 Raveendran .......... G06F 3/0481
345/173
2014/0376878 A1 12/2014 Nakamura et al.
(Continued)

FOREIGN PATENT DOCUMENTS

CN 109451345 A 3/2019
CN 110933510 A * 3/2020 ............. G09B 5/065
(Continued)

*Primary Examiner* — Douglas Wilson
(74) *Attorney, Agent, or Firm* — Conley Rose, P.C.

(57) ABSTRACT

A projection method and system to control at least two of the following: projection content, a projection device, and projection time. The projection method includes: obtaining a projection condition that includes at least two of the following: a projection content condition, a projection device condition, and a projection time condition; receiving a projection instruction used to request to project, to a destination electronic device, multimedia content currently displayed by a source electronic device. The projection instruction includes projection information and if the projection information satisfies the projection condition, the projection method performs projection playback based on a uniform resource locator of the projection content in the projection information.

20 Claims, 17 Drawing Sheets

(51) Int. Cl.
  *G09B 5/06*       (2006.01)
  *H04N 21/41*      (2011.01)
  *H04N 21/485*     (2011.01)
  *H04N 21/858*     (2011.01)
  *G06F 3/04847*    (2022.01)
  *G09G 5/12*       (2006.01)
  *H04N 21/436*     (2011.01)

(52) U.S. Cl.
  CPC ........... *G06F 16/4393* (2019.01); *G09G 5/12* (2013.01); *G09G 2370/16* (2013.01); *H04N 21/4122* (2013.01); *H04N 21/43615* (2013.01); *H04N 21/485* (2013.01); *H04N 21/8586* (2013.01)

(58) Field of Classification Search
  CPC ............. H04N 21/4122; H04N 21/485; H04N 21/43615; G09G 5/12; G09G 2370/16
  See application file for complete search history.

(56) References Cited

U.S. PATENT DOCUMENTS

| | | | |
|---|---|---|---|
| 2016/0364574 A1* | 12/2016 | Plette ................... | G06F 21/6218 |
| 2018/0048590 A1 | 2/2018 | Gordon et al. | |
| 2024/0089526 A1* | 3/2024 | Yang .................... | H04N 21/431 |
| 2024/0406513 A1* | 12/2024 | Selfors ............... | H04N 21/8405 |

FOREIGN PATENT DOCUMENTS

| | | | |
|---|---|---|---|
| CN | 112565843 A | 3/2021 | |
| CN | 112601116 A | 4/2021 | |

\* cited by examiner

Perform projection playback of a teaching video

PROJECTION METHOD AND SYSTEM, AND DEVICE

CROSS-REFERENCE TO RELATED APPLICATIONS

This is a National Stage of International Patent Application No. PCT/CN2022/114628 filed on Aug. 24, 2022, which claims priority to Chinese Patent Application No. 202111157748.9 filed on Sep. 27, 2021. Both of the aforementioned applications are hereby incorporated by reference in their entireties.

TECHNICAL FIELD

This application relates to the field of electronic device technologies, and in particular, to a projection method and system, and a device.

BACKGROUND

Large-screen devices such as smart televisions have excellent sound effect and are suitable for interconnection with small-screen mobile devices. Images, audios, videos, and other resources of the small-screen mobile devices can be played on the large-screen devices. In a plurality of public places, such as some hotels and restaurants, large-sized large-screen devices are mounted on walls to project entertainment information such as advertisements and movies. Currently, before projection, many large-screen devices determine projection devices, and project only content from allowed projection devices. This ensures trustworthiness and security of the projection and prevents occurrence of unknown or malicious projection. However, there is still a problem that content or time of projection of some projection devices does not satisfy current projection scenarios. For example, in a multimedia teaching process, only content related to a teaching video is expected to be projected, but an advertisement is projected. In a public place such as a hotel or a restaurant, an advertisement, an introduction video, or the like of a related subject is expected to be projected, but teaching content is projected. For example, for an adolescent, projection playback is expected to be performed for only 30 minutes, but the projection playback is performed for more than 40 minutes.

SUMMARY

In view of the foregoing content, it is necessary to provide a projection method and system, and a device, to control at least two of the following: projection content, a projection device, and projection time.

According to a first aspect, an embodiment of this application provides a projection method, applied to a destination electronic device. The method includes: obtaining a projection condition, where the projection condition is set based on at least one of the following: a projection place, a projection user group, and a projection mode, the projection condition includes at least two of the following: a projection content condition, a projection device condition, and a projection time condition, the projection content condition includes at least one of the following: a type of projection content, an author of the projection content, and a title of the projection content, and the projection time condition includes at least one of the following: projection forbidden time and projection allowed time: receiving a projection instruction, where the projection instruction is used to request to project, to the destination electronic device, multimedia content currently displayed by a source electronic device, the projection instruction includes projection information, the projection information includes a uniform resource locator of the projection content, the projection information further includes at least two of the following: projection content information, projection device information, and projection time information, and the projection time information is a time at which the source electronic device generates the projection instruction; and if the projection information satisfies the projection condition, performing projection playback based on the uniform resource locator of the projection content in the projection information.

According to the first aspect of this application, the projection condition is set based on the at least one of the following: the projection place, the projection user group, and the projection mode. The projection condition includes the at least two of the following: the projection content condition, the projection device condition, and the projection time condition. The projection instruction including the projection information is received. The multimedia content currently displayed by the source electronic device is projected to the destination electronic device only when the projection information satisfies the projection condition. This can control at least two of the following: the projection content, a projection device, and projection time, so that the content or the time or both of projection satisfy a current projection scenario.

According to some embodiments of this application, the method further includes: if the projection information does not satisfy the projection condition, rejecting projection playback. In this application, if the projection information does not satisfy the projection condition, the projection playback is rejected. This can avoid that the content or the time or both of the projection do not satisfy the current projection scenario.

According to some embodiments of this application, the projection condition is obtained in one or more of the following ways: being received from a condition setting electronic device and being determined in response to an operation on the destination electronic device. In this application, sources of diversified projection conditions of the destination electronic device may be provided by using a projection condition received from the condition setting electronic device, and/or using a projection condition determined in response to the operation on the destination electronic device.

According to some embodiments of this application, after the performing projection playback based on the uniform resource locator of the projection content in the projection information, the method further includes: recording projected time information; and if the projected time information satisfies the projection time condition, continuing to perform projection playback based on the uniform resource locator of the projection content in the projection information in this application, during projection, if the projected time information satisfies the projection time condition, the projection playback continues to be performed based on the uniform resource locator of the projection content in the projection information. The projection time can be monitored, so that the projection time still satisfies the current projection scenario as the projection playback is performed.

According to some embodiments of this application, the method further includes: if the projected time information does not satisfy the projection time condition, ending the projection playback. In this application, during projection, if the projected time information does not satisfy the projection time condition, the projection playback is ended. The projection time can be monitored, to avoid that the projection time does not satisfy the current projection scenario as the projection playback is performed.

According to some embodiments of this application, the projected time information includes at least one of the following: projection duration information and projection time point information, and the projection duration information includes current-round projection duration information or total current-day projection duration information; and the projection time condition includes at least one of the following: a projection duration condition and a projection time interval condition. In this application, the projected time information includes the at least one of the following: the projection duration information and the projection time point information, and the projection time condition includes the at least one of the following: the projection duration condition and the projection time interval condition. Diversified projection time restrictions can be provided.

According to some embodiments of this application, the projection place includes a multimedia teaching place; and the projection condition includes a projection content condition in which the type of the projection content is a teaching type. In this application, the type of the projection content in the projection content condition is set to be the teaching type in the multimedia teaching place, so that only content related to a teaching video is projected in the multimedia teaching place.

According to some embodiments of this application, the projection place includes at least one of the following: a public accommodation place, a catering place, and a public cultural place; and the projection condition includes that the title of the projection content is an advertisement or an introduction of a related subject of a place. In this application, in the at least one of the following: the public accommodation place, the catering place, and the public cultural place, the projection content condition in which the projection title in the projection content condition is the advertisement or the introduction of the related subject of the place is set, so that in a public place such as a hotel or a restaurant, an advertisement, an introduction video, or the like of a related subject is projected.

According to some embodiments of this application, the projection place includes a public leisure place, and the projection user group includes middle-aged and aged persons; and the projection condition includes a projection content condition in which the title of the projection content is a square dance related to fitness. In this application, for the middle-aged and aged persons in the public leisure place, the title of the projection content in the projection content condition is set to be the square dance related to the fitness, so that for the middle-aged and aged persons in a public place such as a park, a square dance or the like is projected.

According to some embodiments of this application, the projection mode includes at least one of the following: a child/an adolescent mode and a timing payment mode; and the projection condition includes at least one projection time condition of the following: projection duration being less than preset duration, a time point being within a preset range, and a time point being not within a preset range. In this application, in the child/adolescent mode and the timing payment mode, the projection time condition is set to be the at least one of the following: the projection duration being less than the preset duration, the time point being within the preset range, and the time point being not within the preset range. A time limit can be imposed on projection playback in the child/adolescent mode and the timing payment mode.

According to some embodiments of this application, the projection time information is a time at which the source electronic device generates the projection instruction, a time at which the source electronic device transmits the projection instruction, a time at which the destination electronic device receives the projection instruction, or a time at which the destination electronic device responds to the projection instruction. In this application, the time of the projection time information is limited to be related to the source electronic device or related to the destination electronic device. A subsequent comparison between the projection time condition in the projection condition and the projection time information in the projection information can be conveniently performed.

According to a second aspect, an embodiment of this application further provides a projection method, applied to a condition setting electronic device. The method includes: setting a projection condition, where the projection condition is set based on at least one of the following: a projection place, a projection user group, and a projection mode, the projection condition includes at least two of the following: a projection content condition, a projection device condition, and a projection time condition, the projection content condition includes at least one of the following: a type of projection content, an author of the projection content, and a title of the projection content, and the projection time condition includes at least one of the following: projection forbidden time and projection allowed time; and sending the projection condition to a destination electronic device, so that the destination electronic device implements projection playback.

According to a third aspect, an embodiment of this application further provides a destination electronic device. The destination electronic device includes a processing unit and a receiving unit; the processing unit is configured to: obtain a projection condition, where the projection condition is set based on at least one of the following: a projection place, a projection user group, and a projection mode, the projection condition includes at least two of the following: a projection content condition, a projection device condition, and a projection time condition, the projection content condition includes at least one of the following: a type of projection content, an author of the projection content, and a title of the projection content, and the projection time condition includes at least one of the following: projection forbidden time and projection allowed time; the receiving unit is configured to: receive a projection instruction, where the projection instruction is used to request to project, to the destination electronic device, multimedia content currently displayed by a source electronic device, the projection instruction includes projection information, the projection information includes a uniform resource locator of the projection content, and the projection information further includes at least two of the following: projection content information, projection device information, and projection time information; and the processing unit is further configured to: if the projection information satisfies the projection condition, perform projection playback based on the uniform resource locator of the projection content in the projection information.

According to some embodiments of this application, the processing unit is further configured to: if the projection information does not satisfy the projection condition, reject projection playback.

According to some embodiments of this application, the projection condition is obtained in one or more of the following ways: being received from a condition setting electronic device and being determined in response to an operation on the destination electronic device.

According to some embodiments of this application, the processing unit is further configured to record projected time information; and the processing unit is further configured to: if the projected time information satisfies the projection time condition, continue to perform projection playback based on the uniform resource locator of the projection content in the projection information.

According to some embodiments of this application, the processing unit is further configured to: if the projected time information does not satisfy the projection time condition, end the projection playback.

According to some embodiments of this application, the projected time information includes at least one of the following: projection duration information and projection time point information, and the projection duration information includes current-round projection duration information or total current-day projection duration information; and the projection time condition includes at least one of the following: a projection duration condition and a projection time interval condition.

According to some embodiments of this application, the projection place includes a multimedia teaching place; and the projection condition includes a projection content condition in which the type of the projection content is a teaching type.

According to some embodiments of this application, the projection place includes at least one of the following: a public accommodation place, a catering place, and a public cultural place; and the projection condition includes a projection content condition in which the title of the projection content is an advertisement or an introduction of a related subject of a place.

According to some embodiments of this application, the projection place includes a public leisure place, and the projection user group includes middle-aged and aged persons; and the projection condition includes a projection content condition in which the title of the projection content is a square dance related to fitness.

According to some embodiments of this application, the projection mode includes at least one of the following: a child/an adolescent mode and a timing payment mode; and the projection condition includes at least one projection time condition of the following: projection duration being less than preset duration, a time point being within a preset range, and a time point being not within a preset range.

According to some embodiments of this application, the projection time information is a time at which the source electronic device generates the projection instruction, a time at which the source electronic device transmits the projection instruction, a time at which the destination electronic device receives the projection instruction, or a time at which the destination electronic device responds to the projection instruction.

According to a fourth aspect, an embodiment of this application further provides a condition setting electronic device. The condition setting electronic device includes a processing unit and a sending unit; the processing unit is configured to: set a projection condition, where the projection condition is set based on at least one of the following: a projection place, a projection user group, and a projection mode, the projection condition includes at least two of the following: a projection content condition, a projection device condition, and a projection time condition, the projection content condition includes at least one of the following: a type of projection content, an author of the projection content, and a title of the projection content, and the projection time condition includes at least one of the following: projection forbidden time and projection allowed time; and the sending unit is configured to send the projection condition to a destination electronic device, so that the destination electronic device implements projection playback.

According to a fifth aspect, an embodiment of this application further provides a projection system. The projection system includes a condition setting electronic device and a destination electronic device; and the condition setting electronic device is configured to perform the projection method according to any one of the possible implementations of the second aspect, and the destination electronic device is configured to perform the projection method according to any one of the possible implementations of the first aspect.

According to a sixth aspect, an embodiment of this application further provides a computer-readable storage medium. The computer-readable storage medium stores a program, and the program enables a computer device to perform the projection method according to any one of the possible implementations of the first aspect or the second aspect.

According to a seventh aspect, an embodiment of this application further provides a computer program product. The computer program product includes computer-executable instructions, the computer-executable instructions are stored in a computer-readable storage medium, at least one processor of a device is capable of reading the computer-executable instructions from the computer-readable storage medium, and the at least one processor executes the computer-executable instructions, to enable the device to perform the projection method according to any one of the possible implementations of the first aspect or the second aspect. For beneficial effect of the third aspect to the seventh aspect and the implementations of the third aspect to the seventh aspect in this application, refer to the first aspect and the implementations of the first aspect, and analysis of beneficial effect of the second aspect. Details are not described herein again.

DESCRIPTION OF EMBODIMENTS

The following terms "first" and "second" are merely intended for a purpose of description, and shall not be understood as indicating or implying relative importance or implying a quantity of indicated technical features. Therefore, a feature limited by "first" or "second" may explicitly or implicitly include one or more features. In the descriptions of embodiments of this application, the word such as "example" or "for example" is used to represent giving an example, an illustration, or a description. Any embodiment or design described as an "example" or "for example" in embodiments of this application should not be explained as being more preferred or having more advantages than another embodiment or design scheme. To be precise, use of the word "example", "for example", or the like is intended to present a related concept in a specific manner.

Unless otherwise defined, all technical and scientific terms used in this specification have same meanings as those usually understood by a person skilled in the art of this application. Terms used in the specification of this application are merely for the purpose of describing specific embodiments, but are not intended to limit this application. It should be understood that, in this application, unless otherwise specified, "a plurality of" means two or more, and "and/or" includes any and all combinations of one or more of associated listed items.

Figure 1A:
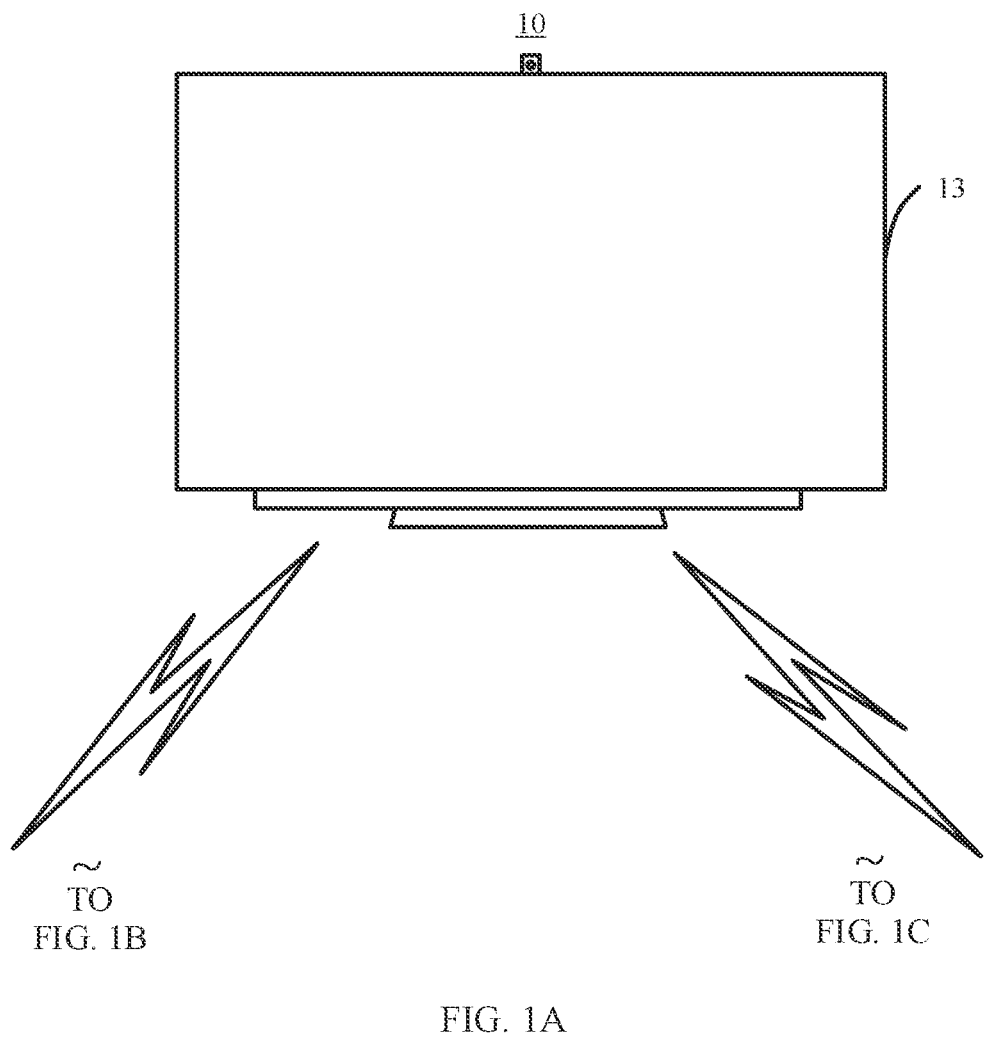
FIG. 1A to FIG. 1C are schematic diagrams of an application environment according to an embodiment of this application.
Figure 1B:
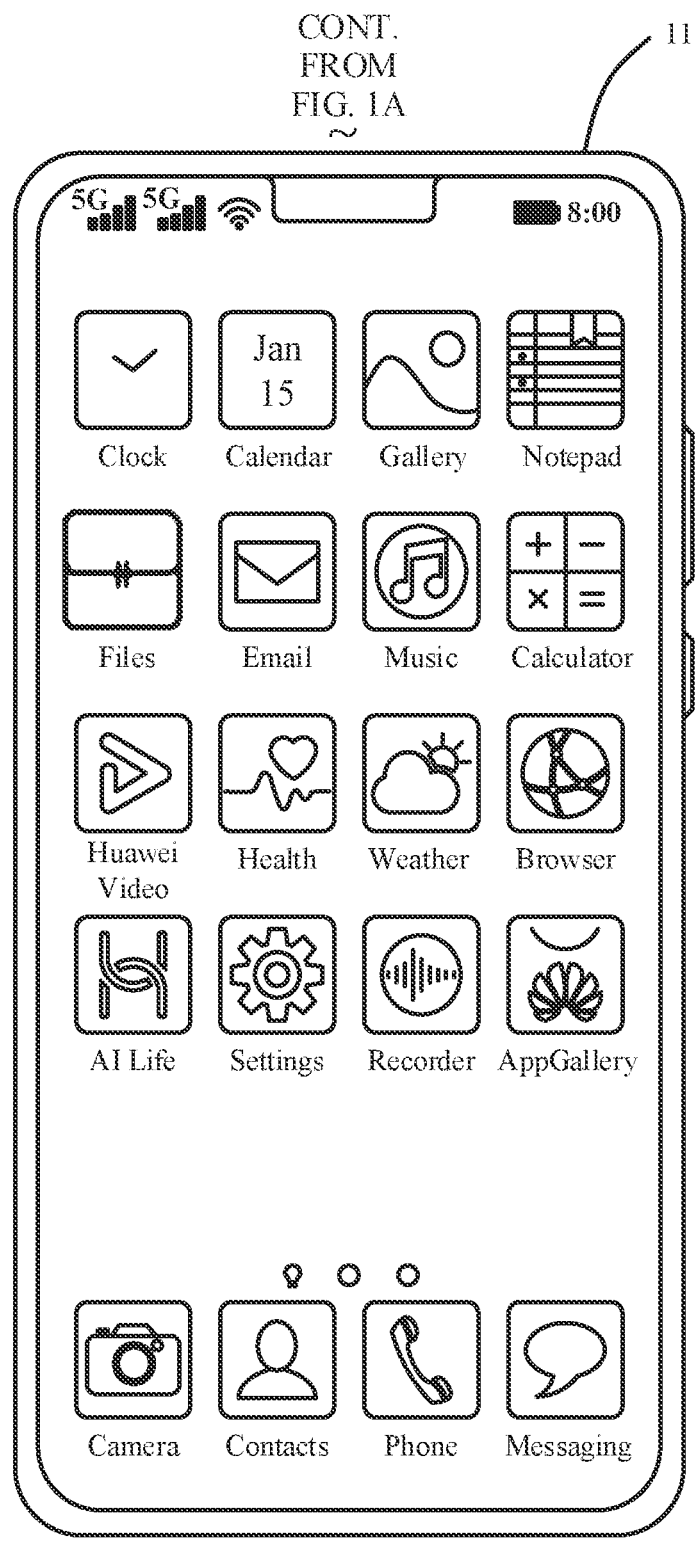
Figure 1C:
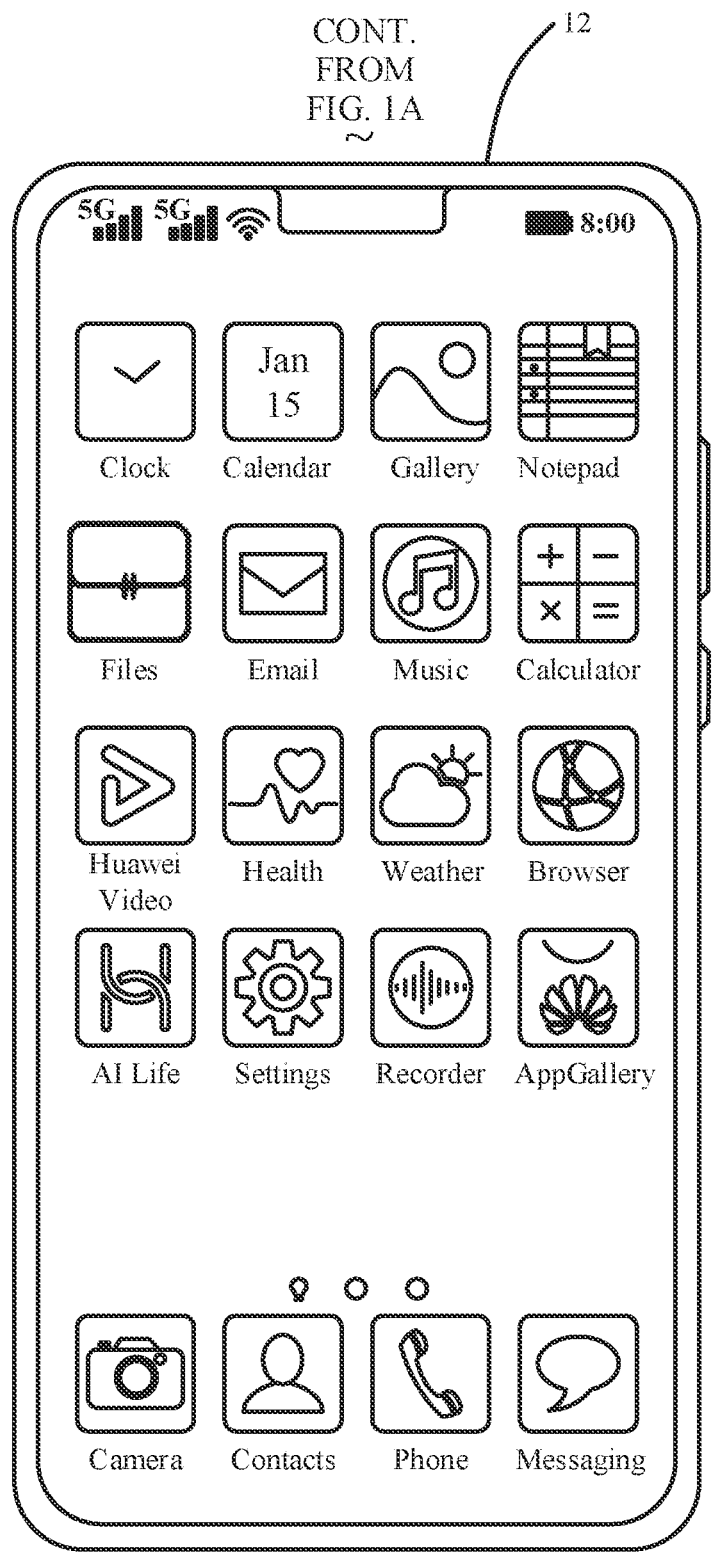

FIG. 1A to FIG. 1C are schematic diagrams of an application environment according to an embodiment of this application. In FIG. 1A to FIG. 1C, a projection system 10 includes a condition setting electronic device 11, a source electronic device 12, and a destination electronic device 13. The condition setting electronic device 11 and the destination electronic device 13, and the source electronic device 12 and the destination electronic device 13 may communicate with each other in a wired or wireless manner. A wired manner may be interconnection through a high-definition multimedia interface (High-Definition Multimedia Interface, HDMI), or by accessing a same router through optical fibers. A wireless manner may be interconnection through Bluetooth, Wi-Fi, a ZigBee network, or the like. This is not limited in this application. The condition setting electronic device 11 and the source electronic device 12 may separately be at least one of the following: a mobile phone, a tablet computer, a desktop computer, a laptop computer, a handheld computer, a notebook computer, an ultra-mobile personal computer (ultra-mobile personal computer, UMPC), a netbook, a personal digital assistant (personal digital assistant, PDA), a cellular phone, and the like. The destination electronic device 13 may be at least one of the following: a tablet computer, a desktop computer, a notebook computer, a smart television, a display device, and the like. The condition setting electronic device 11 and the source electronic device 12 may be the same or may be different. The condition setting electronic device 11 may set a projection condition of the destination electronic device 13. The source electronic device 12 may send a projection instruction to the destination electronic device 13. The destination electronic device 13 may determine, according to the projection instruction, whether the projection condition is satisfied, and display content according to the projection instruction when the projection condition is satisfied. It may be understood that the destination electronic device 13 may alternatively set a projection condition. This is not limited in this application. It may be understood that FIG. 1A to FIG. 1C show that the condition setting electronic device 11 and the source electronic device 12 are mobile phones, and the destination electronic device is a smart television. However, the condition setting electronic device 11, the source electronic device 12, and the destination electronic device may separately be any other appropriate device.

Figure 2:
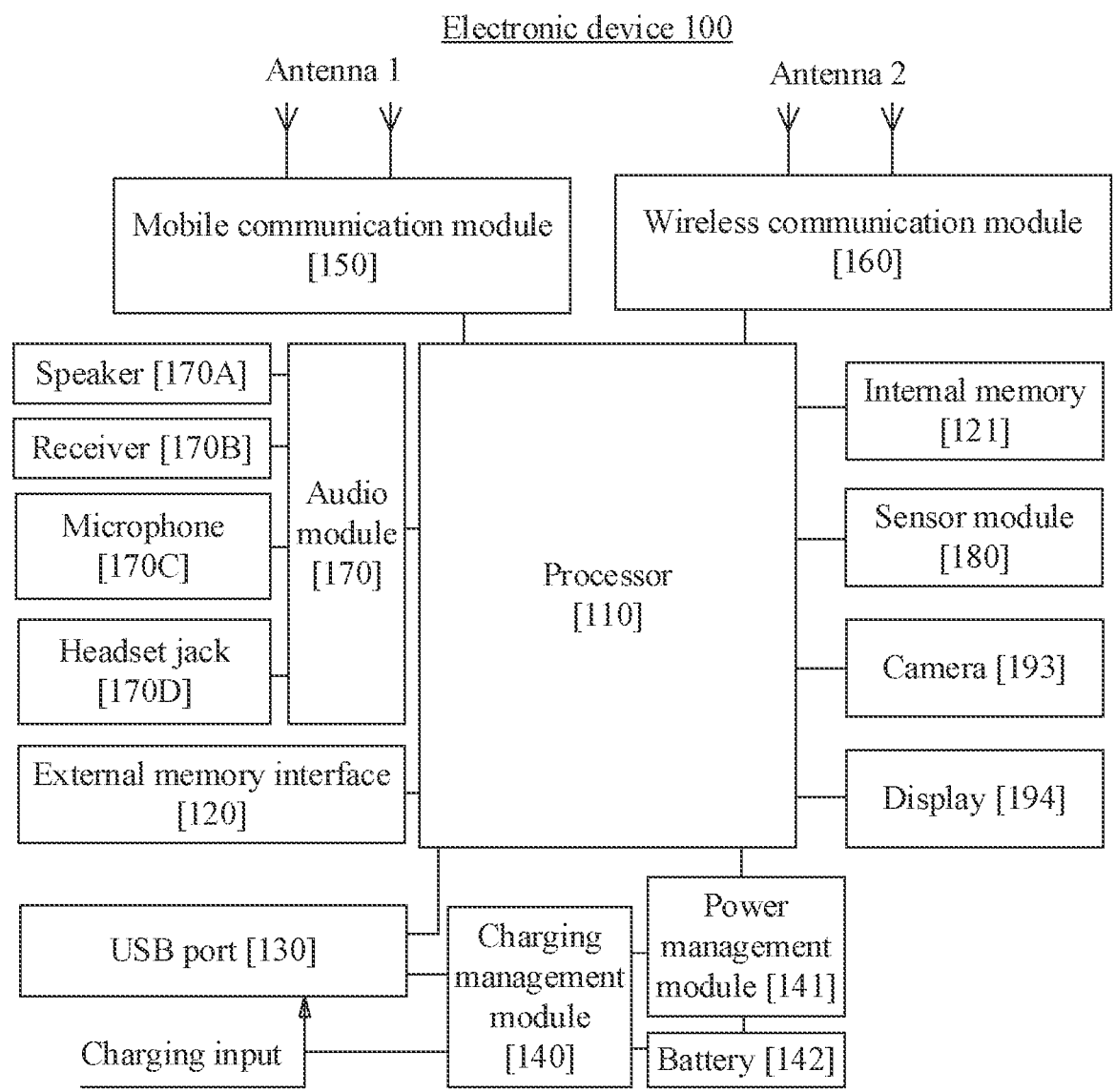
FIG. 2 is a schematic diagram of a structure of an electronic device according to an embodiment of this application.

FIG. 2 is a schematic diagram of a hardware structure of an electronic device according to an embodiment of this application. FIG. 2 is a schematic diagram of a structure of an electronic device 100. The electronic device may be a condition setting electronic device, or may be a source electronic device, or may be a destination electronic device. The condition setting electronic device and the source electronic device may separately be at least one of the following: a mobile phone, a tablet computer, a desktop computer, a laptop computer, a handheld computer, a notebook computer, an ultra-mobile personal computer (ultra-mobile personal computer, UMPC), a netbook, a personal digital assistant (personal digital assistant, PDA), a cellular phone, and the like. The destination electronic device may be at least one of the following: a tablet computer, a desktop computer, a notebook computer, a smart television, and the like. A specific type of the electronic device 100 is not specially limited in this embodiment of this application.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a camera 193, a display 194, and the like.

It may be understood that the structure shown in this embodiment of the present invention does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor. ISP), a controller, a video codec, a digital signal processor (digital signal processor, DSP), a baseband processor, a neural-network processing unit (neural-network processing unit, NPU), and/or the like. Different processing units may be independent devices, or may be integrated into one or more processors.

A memory may be further disposed in the processor 110, and is configured to store instructions and data. In some embodiments, the memory in the processor 110 is a cache memory. The memory may store instructions or data that has been recently used or cyclically used by the processor 110. If the processor 110 needs to use the instructions or the data again, the instructions or the data may be directly invoked from the memory. This avoids repeated access and reduces waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The charging management module 140 is configured to receive a charging input from a charger. The charger may be a wireless charger or a wired charger. In some embodiments of wired charging, the charging management module 140 may receive a charging input from the wired charger through the USB port 130. In some embodiments of wireless charging, the charging management module 140 may receive a wireless charging input by using a wireless charging coil of the electronic device 100, When charging the battery 142, the charging management module 140 may further supply power to the electronic device 100 by using the power management module 141.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electricity leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed to improve antenna utilization. For example, the antenna 1 may be multiplexed as a diversity antenna in a wireless local area network. In some other embodiments, the antenna may be used in combination with a tuning switch.

The mobile communication module 150 may provide a wireless communication solution that is applied to the electronic device 100 and that includes 2G/3G/4G/5G or the like. The mobile communication module 150 may include one or more filters, a switch, a power amplifier, a low noise amplifier (low noise amplifier, LNA), and the like. The mobile communication module 150 may receive an electromagnetic wave by using the antenna 1, perform processing such as filtering or amplification on the received electromagnetic wave, and then transmit the electromagnetic wave to the modem processor for demodulation. The mobile communication module 150 may further amplify a signal modulated by the modem processor, and convert the signal into an electromagnetic wave for radiation by using the antenna 1. In some embodiments, at least some functional modules of the mobile communication module 150 may be disposed in the processor 110. In some embodiments, at least some functional modules of the mobile communication module 150 and at least some modules of the processor 110 may be disposed in a same device.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, and the like), or displays an image or a video by using the display 194. In some embodiments, the modem processor may be an independent device. In some other embodiments, the modem processor may be independent of the processor 110, and may be disposed in a same device as the mobile communication module 150 or another functional module.

The wireless communication module 160 may provide a wireless communication solution that is applied to the electronic device 100, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module 160 may one or more devices integrating one or more communication processing modules. The wireless communication module 160 receives an electromagnetic wave by using the antenna 2, performs frequency modulation and filtering on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation by using the antenna 2.

In some embodiments, the antenna 1 and the mobile communication module 150 in the electronic device 100 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a CNSS, a WLAN, NFC, FM, an TR technology, and/or the like. The GNSS may include a global positioning system (global positioning system GPS), a global navigation satellite system (global navigation satellite system GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 implements a display function by using the GPU, the display 194, the application processor, and the like. The GPU is a microprocessor for image processing and is connected to the display 194 and the application processor. The GPU is configured to perform mathematical and geometric computation for graphic rendering. The processor 110 may include one or more GPUs that execute program instructions to generate or change display information.

The display 194 is configured to display images, videos, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like. In some embodiments, the electronic device 100 may include one or N display s 194. N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (charge-coupled device, CCD) or a complementary metal-oxide-semiconductor (complementary metal-oxide-semiconductor, CMOS) phototransistor. The photosensitive element converts the optical signal into the electrical signal, and then transmits the electrical signal to the ISP for converting the electrical signal into a digital image signal.

The ISP outputs the digital image signal to the DSP for processing. The DSP converts the digital image signal into an image signal in a standard format such as RGB or YUV. In some embodiments, the electronic device 100 may include one or N cameras 193. N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to compress or decompress a digital video. The electronic device 100 may support one or more types of video codecs. In this way, the electronic device 100 can play or record videos in a plurality of coding formats, for example, moving picture experts group (moving picture experts group, MPEG)-1, MPEG-2, MPEG-3, and MPEG-4.

The external memory interface 120 may be configured to connect to an external storage card, for example, a micro SD card, to extend a storage capability of the electronic device 100. The external storage card communicates with the processor 110 through the external memory interface 120, to implement a, data storage function. For example, files such as music and videos are stored in the external storage card.

The internal memory 121 may be configured to store one or more computer programs, and the one or more computer programs include instructions. The processor 110 may run the instructions stored in the internal memory 121, so that the electronic device 100 performs a projection method provided in some embodiments of this application, various functional applications, data processing, and the like. The internal memory 121 may include a program storage region and a data storage region. The program storage region may store an operating system. The program storage region may further store one or more applications (for example, Gallery and Contacts), and the like. The data storage region may store data (for example, a photo and a contact) created during use of the electronic device 100, and the like. In addition, the internal memory 121 may include a high-speed random access memory, and may further include a non-volatile memory, such as one or more disk storage devices, a flash memory device, or a universal flash storage (universal flash storage, UFS). In some other embodiments, the processor 110 runs the instructions stored in the internal memory 121 and/or the instructions stored in the memory disposed in the processor, so that the electronic device 100 performs the projection method provided in embodiments of this application, various functional applications, and data processing.

The electronic device 100 may implement an audio function such as music playing and recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules of the audio module 170 may be disposed in the processor 110.

The speaker 170A, also referred to as a "loudspeaker", is configured to convert an audio electrical signal into a sound signal. The electronic device 100 may be used for listening to music or answering a hands-free call by using the speaker 170A.

The receiver 170B, also referred to as an "earpiece", is configured to convert an audio electrical signal into a sound signal. When a call is answered or voice information is received by using the electronic device 100, the receiver 170B may be put close to a human ear to listen to a voice.

The microphone 170C, also referred to as a "mike" or a "mic", is configured to convert a sound signal into an electrical signal. When making a call or sending voice information, a user may make a sound by moving a human mouth close to the microphone 170C to input a sound signal to the microphone 170C. One or more microphones 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, reduce noise, identify a sound source, implement a directional recording function, and the like.

The headset jack 170D is configured to connect to a wired headset. The headset jack 170 may be the USB port 130, or may be a 3.5 mm open mobile electronic device platform (open mobile terminal platform, OMTP) standard interface or cellular telecommunications industry association of the USA (cellular telecommunications industry association of the USA, CTIA) standard interface.

The sensor module 180 may include a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like. The touch sensor may be disposed on the display. The touch sensor and the display form a touchscreen that is also referred to as a "touch screen".

Figure 3:
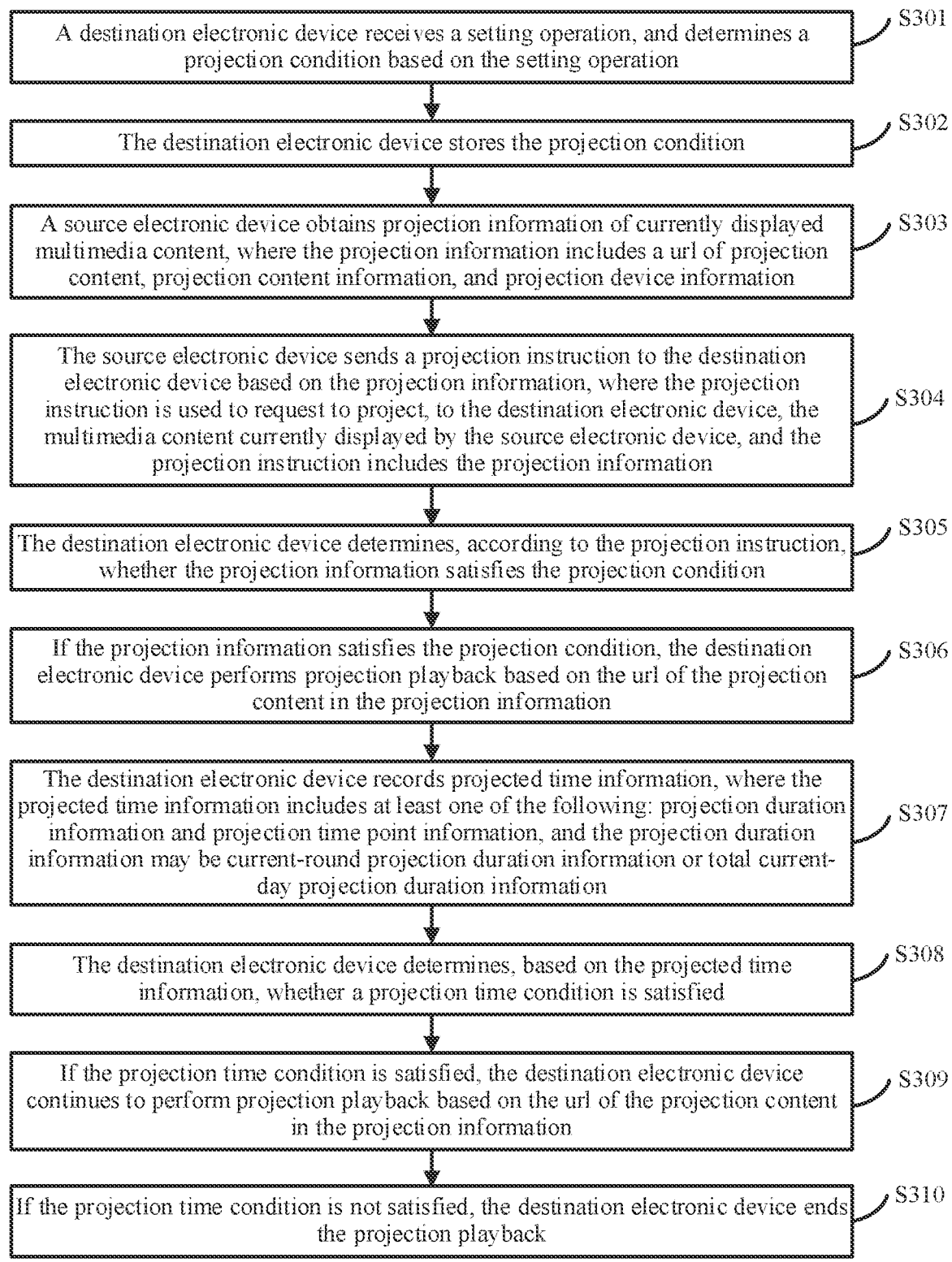
FIG. 3 is a flowchart of a projection method according to an embodiment of this application.

In addition, the foregoing electronic device 100 may further include one or more components such as a button, a motor, an indicator, and a SIM card interface. This is not limited in embodiments of this application, FIG. 3 is a schematic diagram of a projection method according to an embodiment of this application. The projection method includes the following steps.

S301: A destination electronic device receives a setting operation, and determines a projection condition based on the setting operation.

When setting the projection condition, a user may set the projection condition of the destination electronic device by operating a remote control or the like or directly operating the destination electronic device. In some implementations, the user needs to operate the electronic device by using an administrator identity, to set the projection condition of the destination electronic device. If the user uses the administrator identity for the first time, the user may create an administrator password.

For example, in some embodiments, the user may first enter a browser by operating the remote control or the like or directly operating the destination electronic device. For example, the user enters the browser by pressing a combination of buttons on the remote control, for example, a left button of direction buttons and an "OK" button. It may be understood that the user may alternatively move a focus to the browser by pressing direction buttons on the remote control, and press an "OK" button on the remote control to enter the browser. A manner of entering the browser is not limited in this application.

In some embodiments, after receiving a user operation of requesting to enter the browser, the destination electronic device displays a browser page. After viewing that the browser page is displayed on the destination electronic device, the user may further input a factory default address of the destination electronic device by using the remote control or the like to enter a setting page. For example, the user may press number buttons on the remote control to input a factory default address 196.128.121.xx of the destination electronic device to enter the setting page. A manner of entering the setting page is not limited in this application.

Figure 4:
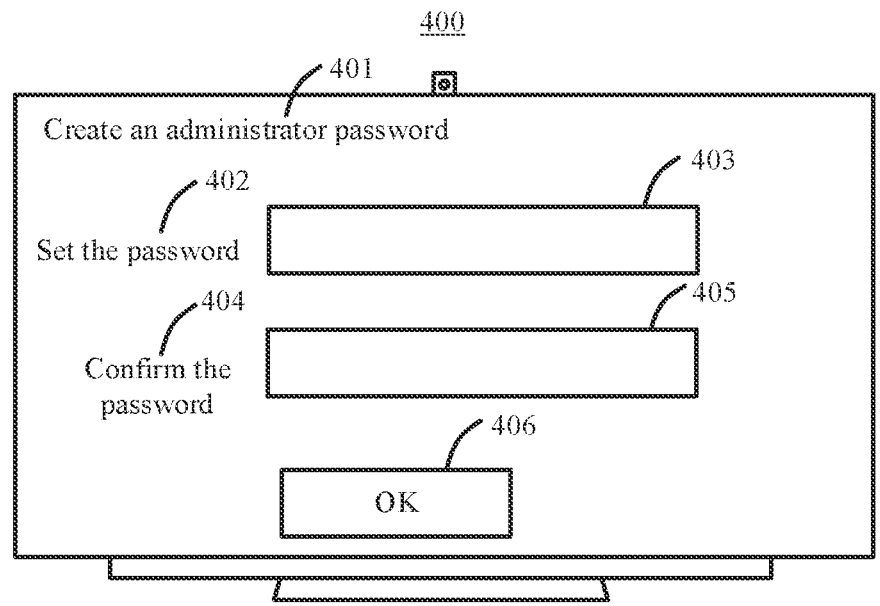
FIG. 4 is a schematic diagram of a user interface for creating an administrator password according to an embodiment of this application.

After receiving a user operation of requesting to enter the setting page, the destination electronic device displays a password setting page 400. For example, in FIG. 4, the password setting page 400 may include a page identifier 401, first prompt information 402, a password input box 403, second prompt information 404, a password verification box 405, and a confirmation button 406. The page identifier 401 may identify a current page. For example, a page identifier "creating an administrator password" in FIG. 4 indicates that the current page is used to create the administrator password. The first prompt information 402 is used to prompt the user to input the password in the password input box. For example, the first prompt information 402 in FIG. 4 is "setting the password". The password input box 403 is used to receive the password input by the user. The password may be a digital password, a biometric feature key, or the like. The second prompt information 404 is used to prompt the user to input the password in the password verification box. For example, the second prompt information 404 in FIG. 4 is "confirming the password". The password verification box 405 is used to receive a verification password input by the user. The verification password may be a digital password, a biometric feature key, or the like. The confirmation button 406 is used to trigger the destination electronic device to display a projection condition setting page when the input verification password matches the input password. In this case, the user may press the number buttons on the remote control to input the password and select the confirmation button to request to enter the projection condition setting page. Optionally, the user may alternatively press the "OK" button on the remote control to move the focus to a keyboard displayed on a display of the destination electronic device, and may press the direction buttons on the remote control to move the focus to a target key on the keyboard, and then press the "OK" button on the remote control to input a digit, a letter, or a character corresponding to the target key on the keyboard displayed on the display. Optionally, if the display of the destination electronic device is a touch-sensitive display, the user may alternatively touch the password input box 403 or the password verification box 405 to enable a keyboard to be further displayed on the password setting page 400, and may input the password by touching the keyboard displayed on the display of the destination electronic device. It may be understood that a manner of requesting to enter the projection condition setting page is not limited in this application. It may be understood that FIG. 4 is an example of a password setting page. The password setting page may further include other prompt information, for example, "the password should be 6 to 32 characters in length and preferably includes a combination of numbers, letters, and symbols" Content and a form of the password setting page are not limited in this application. After receiving a user operation of setting the password, the destination electronic device stores the password. Therefore, the administrator password is set.

In some embodiments, the destination electronic device may display the projection condition setting page, to set the projection condition. The projection condition may be set based on at least one of the following: a projection place, a projection user group, and a projection mode. The projection place may be a restaurant, a park, a hotel, a classroom, an exhibition hall, a museum, or the like. It may be understood that the projection place is not limited in this application. The projection user group is a group of users who view projection. The projection user group may be a student group, an aged-person group, an xx enthusiast group (for example, a table tennis enthusiast group), an xx learning group (for example, an Excel learning group), or the like. It may be understood that the projection user group is not limited in this application. The projection mode may be a child mode, an adolescent mode, a timing payment mode, or the like. It may be understood that the projection mode is not limited in this application.

Figure 5A:
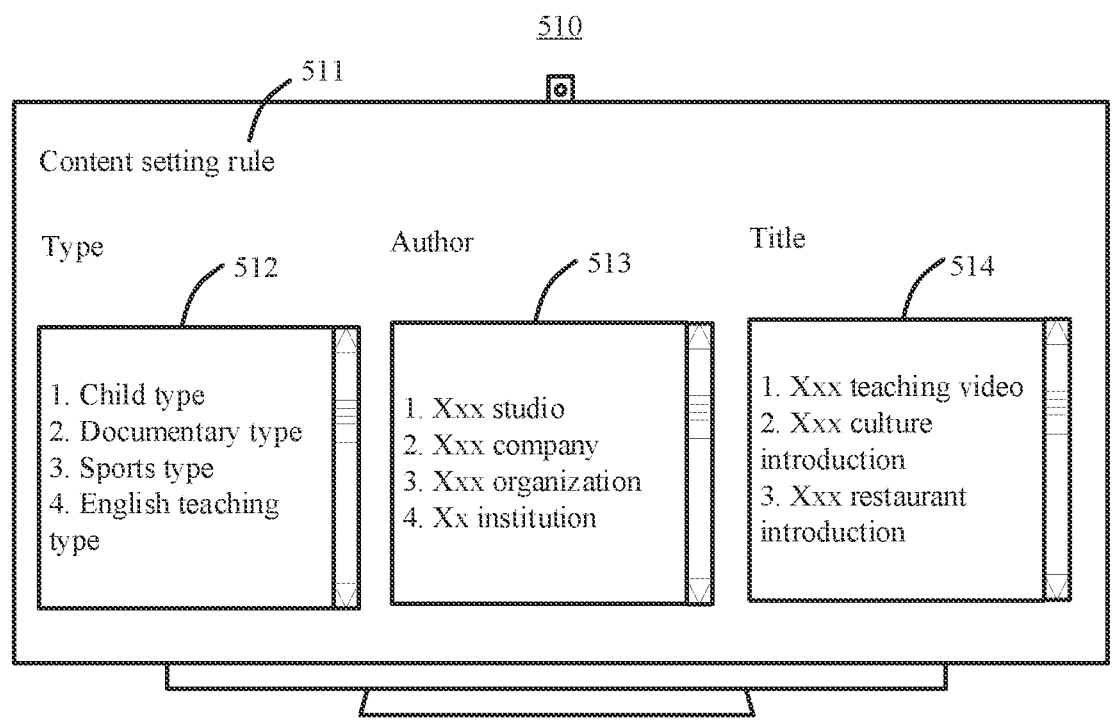
FIG. 5A to FIG. 5C are schematic diagrams of user interfaces for configuring a projection condition according to an embodiment of this application.

The projection condition setting page may include a projection content setting page, a projection device setting page, and a projection time setting page. The projection content setting page, the projection device setting page, and the projection time setting page may be displayed in sequence. For example, as shown in FIG. 5A, after receiving the user operation of setting the password, the destination electronic device first displays the projection content setting page. In FIG. 5A, a projection content setting page 510 may include a page identifier 511, a type setting region 512, an author setting region 513, and a title setting region 514. The page identifier 511 identifies a current page. For example, in FIG. 5A, a page identifier "a content setting rule" identifies that the current page is used to set a content condition. The type setting region 512 is used to display one or more types. For example, in FIG. 5A, the type setting region 512 displays the following: 1 a child type, 2 a documentary type, 3 a sports type, and 4 an English teaching type. The user may select a type of projection content by operating the type displayed in the type setting region 512. For example, the user may tap 4, the English teaching type in the type setting region by using the direction buttons and the "OK" button on the remote control, to select the English teaching type as the type of the projection content. The author setting region 513 is used to display one or more authors. For example, in FIG. 5A, the author setting region 513 displays the following: 1, an xxx studio, 2, an xxx company, 3, an xxx organization, and 4, an xx institution. The user may select an author of the projection content by operating the author displayed in the author setting region 513. For example, the user may tap a type of 1, the xxx studio in the author setting region 513 by using the direction buttons and the "OK" button on the remote control, to select the xxx studio as the author of the projection content. The title setting region 514 is used to display one or more titles. For example, in FIG. 5A, the title setting region 514 displays the following: 1, an xxx teaching video, 2, an xxx culture introduction, and 3, an xxx restaurant introduction. The user may select a title of the projection content by operating the title displayed in the title setting region 514. For example, the user may tap a title of 3, the xxx restaurant introduction in the title setting region 514 by using the direction buttons and the "OK" button on the remote control, to select the title of the xxx restaurant introduction as the title of the projection content, so that only content whose title is the xxx restaurant introduction title can be projected. It may be understood that FIG. 5A is an example of the projection content setting page. The type setting region on the projection content setting page may further include another type, for example, a song, an online course, a television series, a movie, and an online drama. The author setting region may further include another author. The title setting region may further include another title. The projection content setting page may further include a confirmation button for triggering the destination electronic device to determine the projection content and displaying another projection condition setting page, for example, the projection device setting page. Content and a form of the projection content setting page are not limited in this application. It may be understood that the user may select one or more of the type, the author, and the title on the projection content setting page, and may select one or more of the types, one or more of the authors, or one or more of the titles. This is not limited in this application. It may be understood that a manner in which the user operates the content on the projection condition setting page is not limited in this application. It may be understood that type setting, author setting, and title setting may alternatively be performed on two or three different pages, or the like. This is not limited in this application.

Figure 5B:
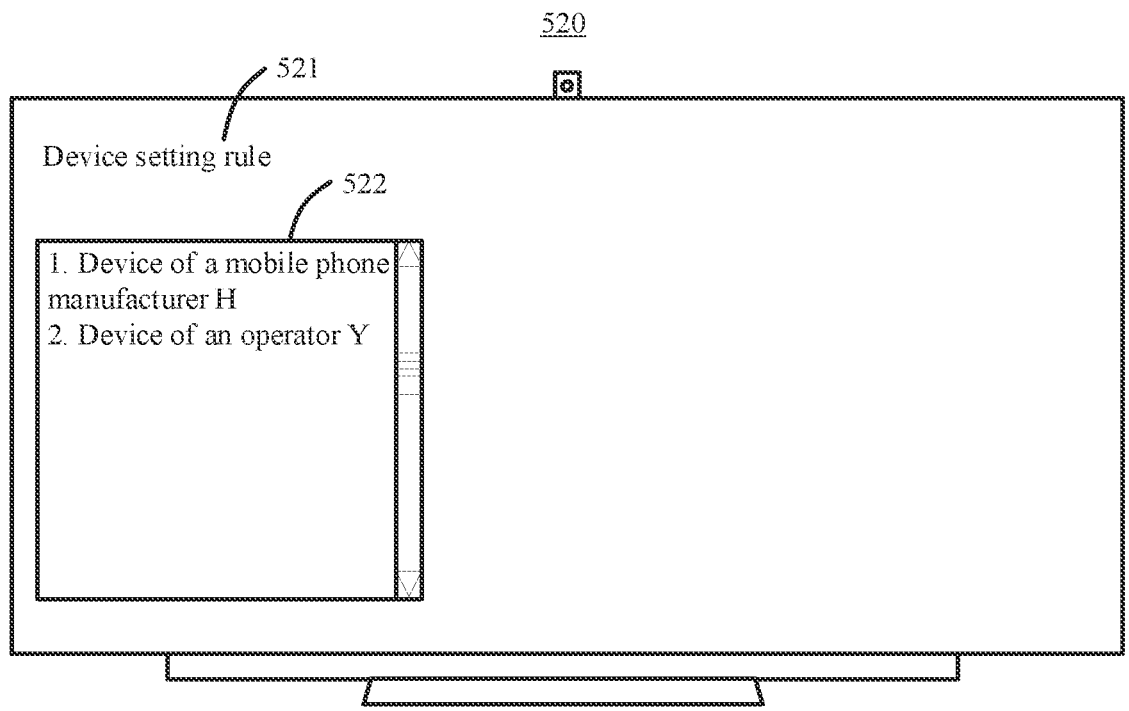

After receiving an operation performed by the user on the projection content setting page, the destination electronic device determines a projection content condition, and displays a projection device setting page 520 shown in FIG. 5B. In FIG. 5B, the projection device setting page 520 includes a page identifier 521 and a device setting region 522. The page identifier 521 identifies a current page. For example, in FIG. 5B, a page identifier "a device setting rule" identifies that the current page is used to set a device condition. The device setting region 522 is used to display one or more devices. For example, in FIG. 5B, the device setting region 522 displays the following: 1, a device of a mobile phone manufacturer H and 2, a device of an operator Y The device of the mobile phone manufacturer H may be used to limit a projection device to be the device of the mobile phone manufacturer H. A device of an operator may be, for example, a device on which a SIM card of China Mobile is installed, a device on which a SIM card of China Unicom is installed, or a device on which a SIM card of China Telecom is installed. The device of the operator Y may be used to limit the projection device to be a device on which a SIM card of the operator Y is installed. Therefore, in some implementations, projection time of a specific operator may be limited. For example, a user of China Mobile may be forbidden to perform projection in a specific time period, but a user of another operator may be free to perform projection in the time period. The user may select the projection device by operating the device displayed in the device setting region 522. For example, the user may tap 1, the device of the mobile phone manufacturer 1 in the device setting region 522 by using the direction buttons and the "OK" button on the remote control, to select the device of the mobile phone manufacturer H as the projection device, so that only a mobile phone of a brand H is allowed to perform projection. It may be understood that FIG. 5B is an example of the projection device setting page. The projection device setting page may further include another device, for example, an H operating system device, a device whose IP address is XXX, and a device whose MAC address is xxx. The projection device setting page may further include a confirmation button for triggering the destination electronic device to determine the projection device and display the projection time setting page. Content and a form of the projection device setting page are not limited in this application. It may be understood that the user may select one or more of the devices on the projection device setting page. This is not limited in this application. It may be understood that a manner in which the user operates the content on the projection device setting page is not limited in this application. It may be understood that the device setting rule may alternatively be set through selection of a device that is forbidden to perform projection.

Figure 5C:
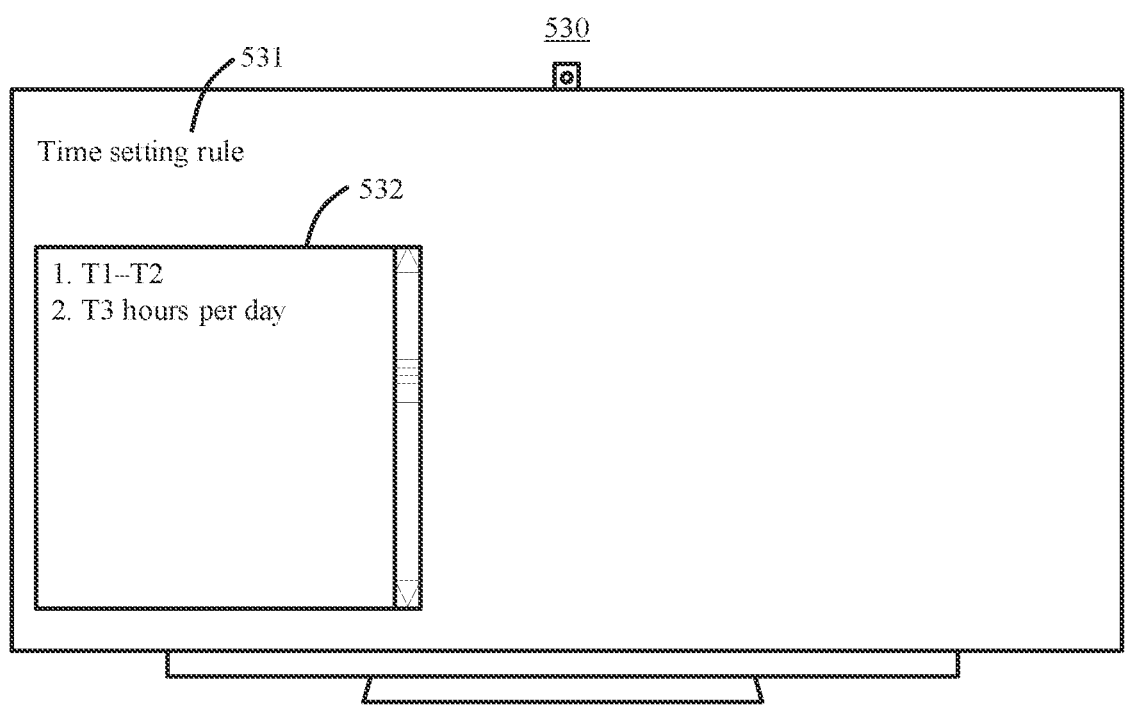

After receiving the operation performed by the user on the projection device setting page, the destination electronic device determines a projection device condition, and displays a projection time setting page 530 shown in FIG. 5C. In FIG. 5C, the projection time setting page 530 includes a page identifier 531 and a time setting region 532. The page identifier 531 identifies a current page. For example, in FIG. 5C, a page identifier "a time setting rule" identifies that the current page is used to set a time condition. The time setting region 532 is used to display one or more times. For example, in FIG. 5C, the time setting region 532 displays the following: 1. T1-T2 and 2 T3 hours per day. The user may select projection time by operating the time displayed in the time setting region 532. For example, the user may tap 1, the T1-T2 in the time setting region 532 by using the direction buttons and the "OK" button on the remote control, to select the T1-T2 as the projection time. It may be understood that FIG. 5C is an example of the projection time setting page. The projection time setting page may further include another time, for example, T4 hours per round, an interval of T5 hours that is from previous projection and after which projection may be performed, T6-T7 during which projection is forbidden, and time from condition setting to T8 during which projection is allowed. The projection time setting page may further include time that the user is supported to customize, for example, projection is allowed in a specified time period (_:_-_:_), projection is forbidden in a specified time period (_:_-_:_) and projection duration is limited (projection duration limit: _hours/minutes), so that the user can customize the time by operating the projection time setting page. The projection time setting page may further include a confirmation button for triggering the destination electronic device to determine the projection time. Content and a form of the projection time setting page are not limited in this application. It may be understood that the user may select one or more of the times on the projection time setting page. This is not limited in this application. It may be understood that a manner in which the user operates the content on the projection time setting page is not limited in this application.

For example, in a multimedia teaching classroom, only a teaching video is allowed to be projected, and the destination electronic device may set, based on the foregoing process, the projection condition as follows: a, a projection content condition: a type: English teaching; and an author: an X institution; b, a projection device condition: a mobile phone of a brand H, and an operator Y; and c, a projection time condition: two hours.

It may be understood that the destination electronic device may obtain, by using a sensor or a user setting, the at least one of the following: the projection place, the projection user group, and the projection mode, and display the projection condition setting page based on the at least one of the following: the projection place, the projection user group, and the projection mode. Alternatively, the destination electronic device displays the projection condition setting page based on one or more types, one or more pieces of content, and one or more times that are set by the user, and based on the at least one of the following: the projection place, the projection user group, and the projection mode. Alternatively, the destination electronic device sets the projection condition based on one or more types, one or more pieces of content, and one or more times that are set by the user, and based on the at least one of the following: the projection place, the projection user group, and the projection mode. This is not limited in this application.

It may be understood that the display sequence of the projection content setting page, the projection device setting page, and the projection time setting page may alternatively be another sequence. For example, after receiving the user operation of setting the password, the destination electronic device displays the projection device setting page, and then correspondingly displays the projection content setting page and the projection time setting page based on operations. This is not limited in this application.

It may be understood that the projection condition may include only at least two of the following: the projection content, the projection device, and the projection time. This is not limited in this application.

It may be understood that, based on user operations, the destination electronic device may further add a type, an author, and/or a title to the projection content setting page for selection, or delete or edit the existing types, authors, and/or titles; add a device to the projection device setting page for selection, or delete or edit the existing devices; add a time to the projection time setting page for selection, or delete or edit the existing times; and the like. This is not limited in this application.

Figure 6:
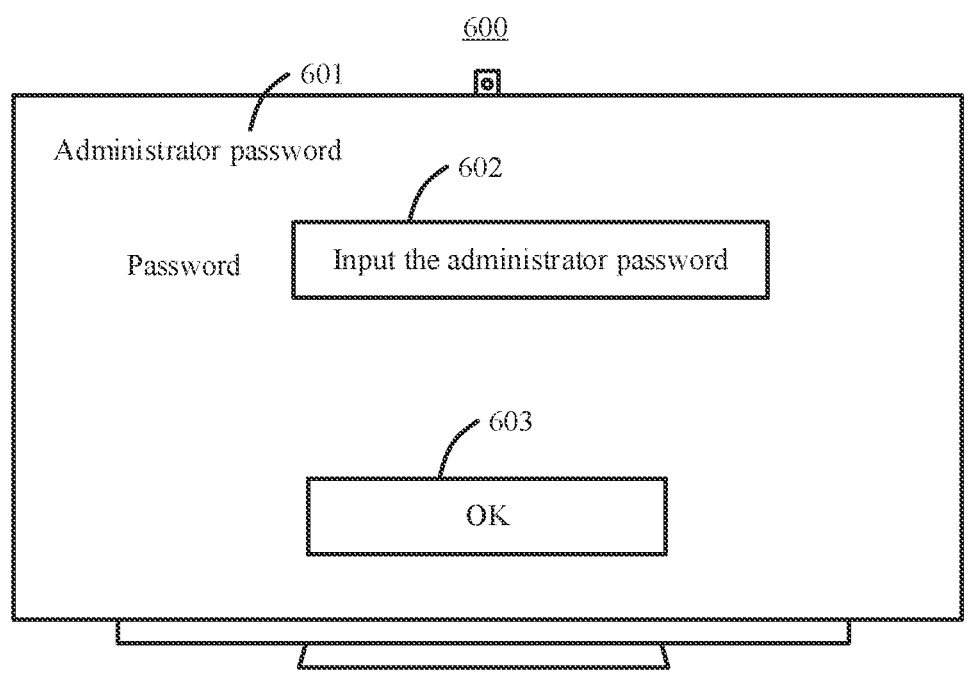
FIG. 6 is a schematic diagram of a user interface for identity authentication according to an embodiment of this application.

If the administrator identity is not used for the first time, a process of displaying a browser page by the destination electronic device is the same as the foregoing process of displaying the browser page by the destination electronic device. Details are not described herein again. In some embodiments, after viewing that the browser page is displayed on the destination electronic device, the user may input a factory default address of the destination electronic device by using the remote control or the like to enter a setting page as described above. After receiving a user operation of requesting to enter the setting page, the destination electronic device displays an identity authentication page. For example, in FIG. 6, an identity authentication page 600 may include a page identifier 601, a password input box 602, and a confirmation button 603. The page identifier 601 may identify a current page. For example, a page identifier "an administrator password" in FIG. 6 indicates that the current page is used to authenticate an administrator. The password input box 602 is used to receive a password input by the user. The password may be a digital password, a biometric feature key, or the like. The confirmation button 603 is used to trigger the destination electronic device to display the foregoing projection condition setting page when the input password matches a set administrator password. In this case, the user may press the number buttons on the remote control to input the password and select the confirmation button to request to enter the projection condition setting page. Optionally, the user may alternatively press an "OK" button on the remote control to move a focus to a keyboard displayed on a display of the destination electronic device, and may press direction buttons on the remote control to move the focus to a target key on the keyboard, and then press the "OK" button on the remote control to input, to the password input box 602, a digit, a letter, or a character corresponding to the target key on the keyboard displayed on the display. Optionally, if the display of the destination electronic device is a touch-sensitive display, the user may alternatively touch the password input box 602 to enable a keyboard to be further displayed on the identity authentication page 600, and may input the password by touching the keyboard displayed on the display of the destination electronic device. It may be understood that FIG. 6 is an example of the identity authentication page. The identity authentication page may further include prompt information, for example, inputting the administrator password. Content and a form of the identity authentication page are not limited in this application.

Figure 7:
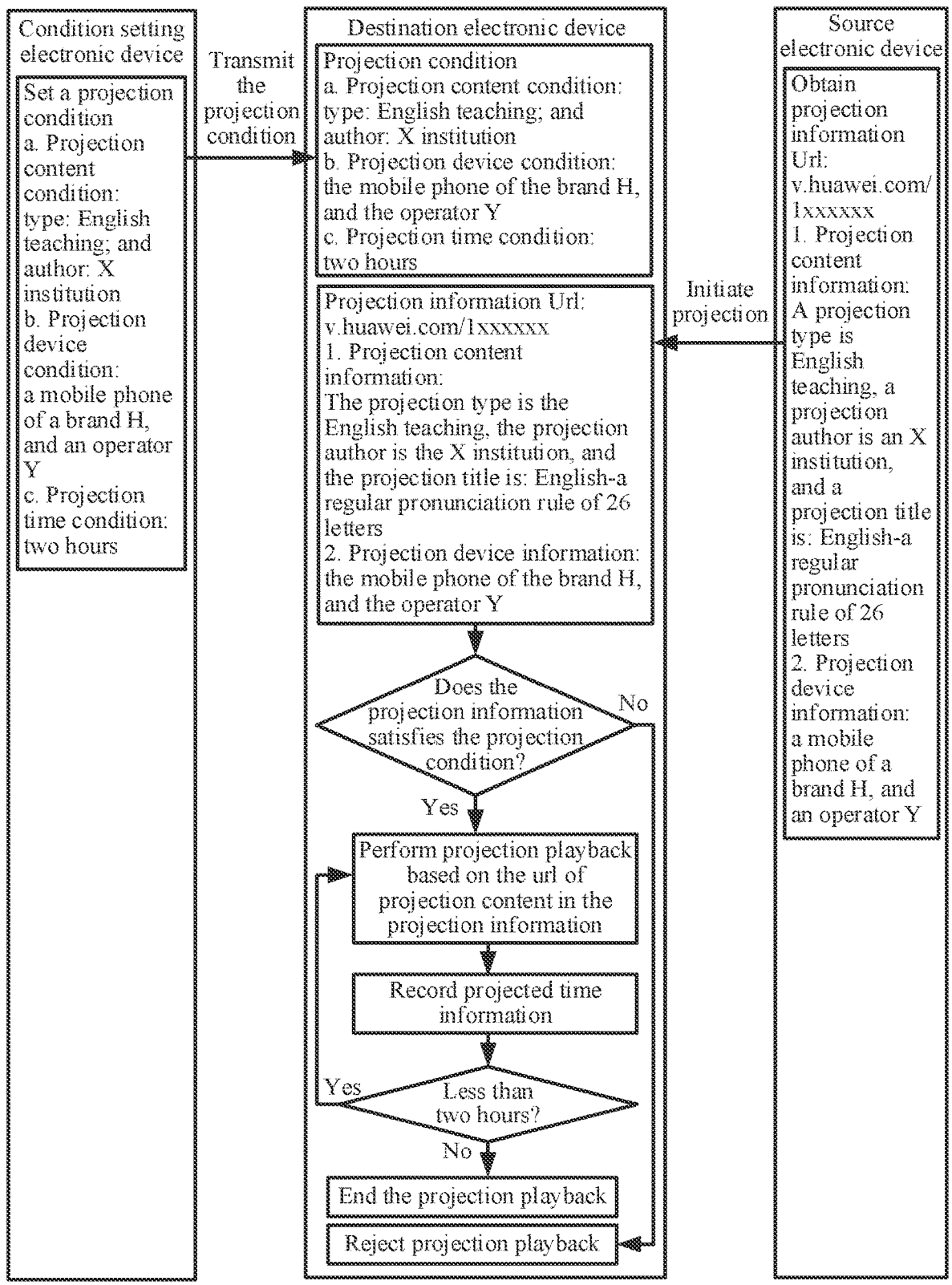
FIG. 7 is a schematic diagram of a projection method according to an embodiment of this application.

It may be understood that, other than the foregoing description that the destination electronic device directly receives a setting operation of the user to determine the projection condition, the destination electronic device may alternatively receive a projection condition transmitted by a condition setting electronic device, and determine the projection condition transmitted by the condition setting electronic device as the projection condition of the destination electronic device. Before transmitting the projection condition, the condition setting electronic device may first receive, by using an application (APP) set on the condition setting electronic device, a setting operation of selecting the destination electronic device, a password setting operation, and a projection condition setting operation, and determine the projection condition based on the setting operations. As shown in FIG. 7, the condition setting electronic device may also set the projection condition for the first time or not for the first time. This is not limited in this application.

S302: The destination electronic device stores the projection condition.

S303: A source electronic device obtains projection information of currently displayed multimedia content, where the projection information includes a url (uniform resource locator) of the projection content, projection content information, and projection device information; the projection content information includes at least one of the following: a projection type, a projection author, and a projection title; and the projection device information may include at least one of the following: a brand of the source electronic device, an operator of the source electronic device, an operating system of the source electronic device, an IP address of the source electronic device, and a MAC address of the source electronic device.

Figure 8:
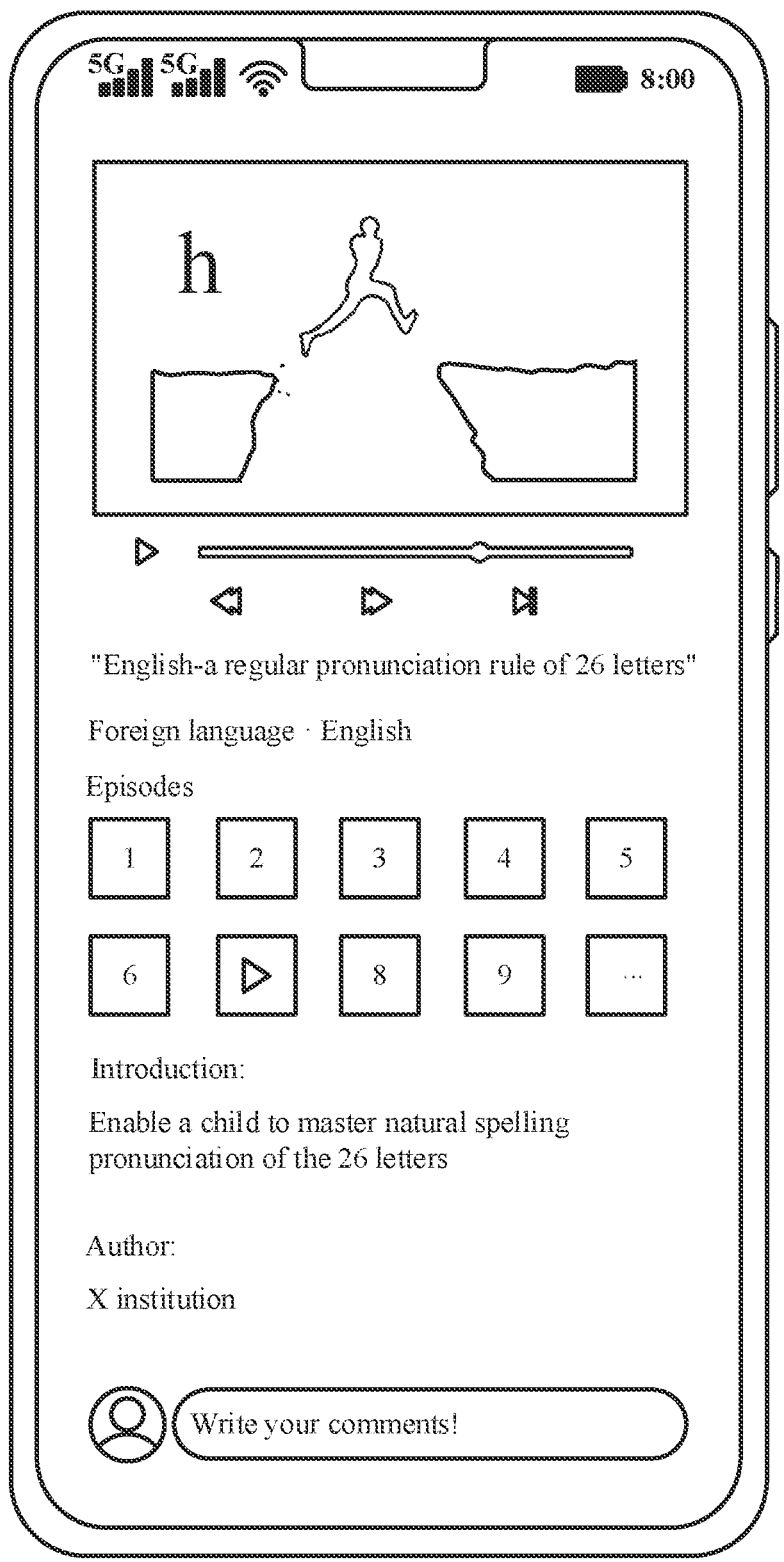
FIG. 8 is a schematic diagram of projection content from a network according to an embodiment of this application.

The multimedia content currently displayed by the source electronic device may come from a network or from a local. In some embodiments, if the currently displayed multimedia content comes from the network, the source electronic device may determine a url and multimedia information of the currently displayed multimedia content that is received from a network side. The multimedia information may include a multimedia name, a multimedia author, a multimedia introduction, a multimedia content category, and the like. The source electronic device may determine the projection content information based on the multimedia information. For example, as shown in FIG. 8, the source electronic device plays, by using a Huawei Video APP, multimedia content whose url is v.huawei.com/1xxxxxx. In FIG. 8, a multimedia name of the multimedia content is: English—a regular pronunciation rule of 26 letters, a multimedia author is an X institution, a multimedia introduction is: enabling a child to master natural spelling pronunciation of the 26 letters, and a multimedia content category is: a foreign language English. It may be understood that FIG. 8 is merely an example of the currently displayed multimedia content. Content and a form of the currently displayed multimedia content are not limited in this application. In this case, as shown in FIG. 7, the source electronic device may determine that the url of the projection content is: v.huawei.com/1xxxxxx, the projection type is the English teaching, the projection author is the X institution, and the projection title is: English-a regular pronunciation rule of 26 letters. The source electronic device further obtains the projection device information. The projection device information may be, for example, that the brand of the source electronic device is a mobile phone manufacturer H, and the operator of the source electronic device is an operator Y.

Figure 9:
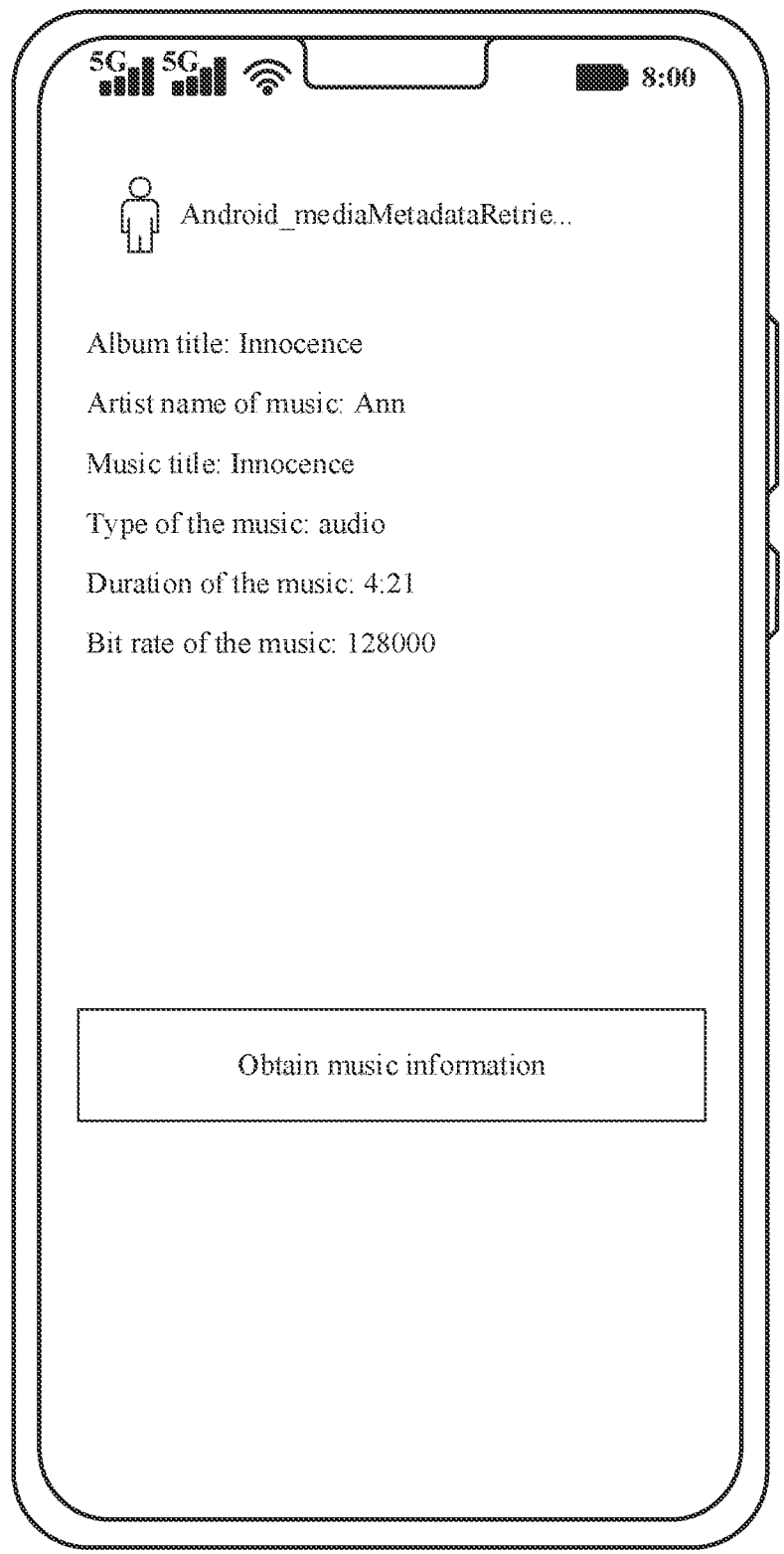
FIG. 9 is a schematic diagram of projection content from a local according to an embodiment of this application.

In some embodiments, if the currently displayed multimedia content is from the local, the source electronic device may determine the IP address of the source electronic device and a name of the currently displayed multimedia content, to generate a url link. The url link may be, for example, 192.168.124.6/1.avi. 192.168.124.6 is the IP address of the source electronic device, and 1.avi is the name of the currently displayed multimedia content. It may be understood that the url link may alternatively be generated on another basis, for example, may alternatively be generated based on a device identifier of the source electronic device. This is not limited in this application. The source electronic device may further obtain metadata information of multimedia content that is obtained through analysis when a local player plays local multimedia content. The metadata information of the multimedia content may include a thumbnail, audio and video encoding types, a bit rate, duration, and other metadata information. It may be understood that the metadata information of the multimedia content may include other different metadata information. This is not limited in this application. The source electronic device may further determine the projection content information based on the metadata information of the multimedia content. For example, as shown in FIG. 9, the source electronic device plays, by using a player provided by the operating system, a song created by the user. Metadata information of the song includes the following: a title, an author, a type, duration, and a bit rate. In FIG. 9, a music title is: innocence, an artist name of music is: Ann, a type of the music is: audio, duration of the music is 4:21, and a bit rate of the music is 128000. It may be understood that FIG. 9 is merely an example of the currently displayed multimedia content, Content and a form of the currently displayed multimedia content are not limited in this application. In this case, the source electronic device may determine that the url of the projection content is: 192.168.124.6/1.avi, the projection type is a song, the projection author is Ann, and the projection title is: innocence. A process in which the source electronic device obtains the projection device information if the currently displayed multimedia content comes from the local is the same as a process in which the source electronic device obtains the projection device information when the currently displayed multimedia content comes from the network. Details are not described herein again. For example, the projection device information is: the brand of the source electronic device is the mobile phone manufacturer H, the operator of the source electronic device is the operator Y, the operating system of the source electronic device is an Android system, the IP address of the source electronic device is 192.168.124.6, and the MAC address of the source electronic device is ac:e3:42:58:d3:fa.

S304: The source electronic device sends a projection instruction to the destination electronic device based on the projection information, where the projection instruction is used to request to project, to the destination electronic device, the multimedia content currently displayed by the source electronic device, and the projection instruction includes the projection information.

As shown in FIG. 7, the source electronic device sends the projection instruction to the destination electronic device. The projection information further includes projection time information. The projection time information is a time at which the source electronic device generates the projection instruction, a time at which the source electronic device transmits the projection instruction, a time at which the destination electronic device receives the projection instruction, or a time at which the destination electronic device responds to the projection instruction, or the like, so that the time of the projection time information may be limited to be related to the source electronic device or related to the destination electronic device. The source electronic device may send the projection instruction to the destination electronic device by using HTTP, SOAP, or another application layer protocol. It may be understood that a protocol used by the source electronic device to send the projection instruction to the destination electronic device is not limited in this application.

S305: The destination electronic device determines, according to the projection instruction, whether the projection information satisfies the projection condition.

In some embodiments, the destination electronic device determines, according to the projection instruction, whether the projection content information matches the projection content condition, whether the projection device information matches the projection device condition, and whether the projection time information matches the projection time condition. If the projection content information matches the projection content condition, the projection device information matches the projection device condition, and the projection time information matches the projection time condition, it is determined that the projection information satisfies the projection condition. If there is at least one mismatch in the following: the projection content information and the projection content condition, the projection device information and the projection device condition, and the projection time information and the projection time condition, it is determined that the projection information does not satisfy the projection condition. The matching includes full matching and substantive matching. The full matching means that content is completely the same. The substantive matching means that substantive content is consistent.

The foregoing example in which projection is performed in the classroom and the currently displayed multimedia content is from the network is still used for description. As shown in FIG. 7, the projection condition includes the following: a, the projection content condition: the type: the English teaching; and the author: the X institution; b, the projection device condition: the mobile phone of the brand H, and the operator Y; and c, the projection time condition: two hours. The projection information includes the following: 1, the projection content information: the projection type is the English teaching, the projection author is the X institution, and the projection title is: English-a regular pronunciation rule of 26 letters; and 2, the projection device information: the mobile phone of the brand H, and the operator Y. The destination electronic device compares the projection information with the projection condition. If it is determined that the projection content information matches the projection content condition, the projection device information matches the projection device condition, and the projection time information matches the projection time condition, the destination electronic device determines that the projection information satisfies the projection condition.

The foregoing example in which projection is performed in the classroom and the currently displayed multimedia content is from the local is still used for description. The projection condition includes the following: a, the projection content condition: the type: the English teaching; and the author: the X institution: b, the projection device condition: the mobile phone of the brand H, and the operator Y; and c, the projection time condition: two hours. The projection information includes the following: 1, the projection content information: the projection type is the song, the projection author is Ann, and the projection title is: innocence; and 2, the projection device information: the mobile phone of the brand H, and the operator Y. The destination electronic device compares the projection information with the projection condition. If it is determined that the projection content information does not match the projection content condition, the projection device information matches the projection device condition, and the projection time information matches the projection time condition, the destination electronic device determines that the projection information does not satisfy the projection condition.

S306: If the projection information satisfies the projection condition, the destination electronic device performs projection playback based on the url of the projection content in the projection information.

The foregoing example in which projection is performed in the classroom and the currently displayed multimedia content is from the network is still used for description. As shown in FIG. 7, the destination electronic device determines that the projection information satisfies the projection condition, and performs the projection playback. There are two manners in which the destination electronic device performs the projection playback based on the url of the projection content in the projection information. In a first manner, to-be-viewed multimedia content is downloaded to the destination electronic device based on the url of the projection content in the projection information, and is played by using a player provided by the destination electronic device. In a second manner, an installed player is automatically started based on the url of the projection content in the projection information to connect to a multimedia server that provides the projection content, for playing. If the projection information does not satisfy the projection condition, the destination electronic device rejects projection playback. As shown in FIG. 7, the destination electronic device determines that the projection information does not satisfy the projection condition, and rejects the projection playback.

S307: The destination electronic device records projected time information, where the projected time information includes at least one of the following: projection duration information and projection time point information, and the projection duration information may be current-round projection duration information or total current-day projection duration information.

As shown in FIG. 7, the destination electronic device records the projected time information after starting the projection playback. Specifically, the destination electronic device further sends a timing instruction to a timing module of the destination electronic device when starting the projection playback. The timing module is configured to start timing according to the timing instruction. The timing module may be a timer, a clock, and/or the like. The timer is configured to start to record the projection duration information according to the timing instruction. The clock is configured to start to record current projection time point information according to the timing instruction.

S308: The destination electronic device determines, based on the projected time information, whether the projection time condition is satisfied.

In some embodiments, if the projection time condition is a projection duration condition, when the projection duration information in the projected time information is less than the projection time condition, the destination electronic device determines that the projection time condition is satisfied.

The foregoing example in which projection is performed in the classroom and the currently displayed multimedia content is from the network is still used for description. As shown in FIG. 7, the projection time condition includes two hours, and the projection duration information may be, for example, one hour. The destination electronic device compares the projection duration information with the projection time condition. If it is determined that the projection duration information is less than the projection time condition, the destination electronic device determines that the projection time condition is satisfied.

For another example, the projection time condition includes that projection is allowed from starting of projection to 10 o'clock. The projection duration information is one hour. The destination electronic device determines that the projection time condition is two hours. Comparison is performed between the projection duration information and the projection time condition. If it is determined that the projection duration information is less than the projection time condition, the destination electronic device determines that the projection time condition is satisfied.

It may be understood that, if the projection time condition is the projection duration condition, when the projection duration information in the projected time information is greater than or equal to the projection time condition, the destination electronic device further determines that the projection time condition is not satisfied.

In some embodiments, if the projection time condition is a projection time interval condition, when the projection time point information in the projected time information is within the projection time interval condition, the destination electronic device determines that the projection time condition is satisfied.

For example, if the projection time condition includes 10:00-12:00, and the projection time point information is 11:00, the destination electronic device compares the projection time point information with the projection time condition. If it is determined that the projection time point information is within the projection time interval condition, the destination electronic device determines that the projection time condition is satisfied.

It may be understood that, if the projection time condition is the projection time interval condition, when the projection time point information in the projected time information is not within the projection time interval condition, the destination electronic device determines that the projection time condition is not satisfied.

If the projection time condition is not within the projection time interval condition, when the projection time point information in the projected time information is not within the projection time interval condition, the destination electronic device determines that the projection time condition is satisfied.

It may be understood that, if the projection time condition is a non-projection time interval condition, when the projection time point information in the projected time information is within the projection time interval condition, the destination electronic device further determines that the projection time condition is not satisfied.

S309: If the projection time condition is satisfied, the destination electronic device continues to perform projection playback based on the url of the projection content in the projection information.

As shown in FIG. 7, if the projection duration information is less than the projection time condition of two hours, the projection time condition is satisfied, and the destination electronic device continues to perform the projection playback based on the url of the projection content in the projection information. A process in which the destination electronic device continues to perform the projection playback based on the url of the projection content in the projection information is the same as a process in which the destination electronic device performs the projection playback based on the url of the projection content in the projection information in the foregoing step S306. Details are not described herein again.

S310: If the projection time condition is not satisfied, the destination electronic device ends the projection playback.

As shown in FIG. 7, as playback is performed, the projection time information continuously changes. If the projection duration information is greater than the projection time condition of two hours, the projection time condition is not satisfied, and the destination electronic device ends the projection playback. The projection playback ended by the destination electronic device is current-round projection playback.

It may be understood that, after the destination electronic device ends the projection playback, the source electronic device or another electronic device may further perform other projection playback based on the foregoing steps, and a projection condition does not need to be set each time projection playback is performed.

It may be understood that, after the destination electronic device ends the projection playback, the condition setting electronic device, another electronic device, or the destination electronic device may further continue to set a projection condition, so that the source electronic device or another electronic device re-executes projection playback.

The following describes the projection method in this embodiment of this application in detail with reference to a specific application scenario.

Figure 10:
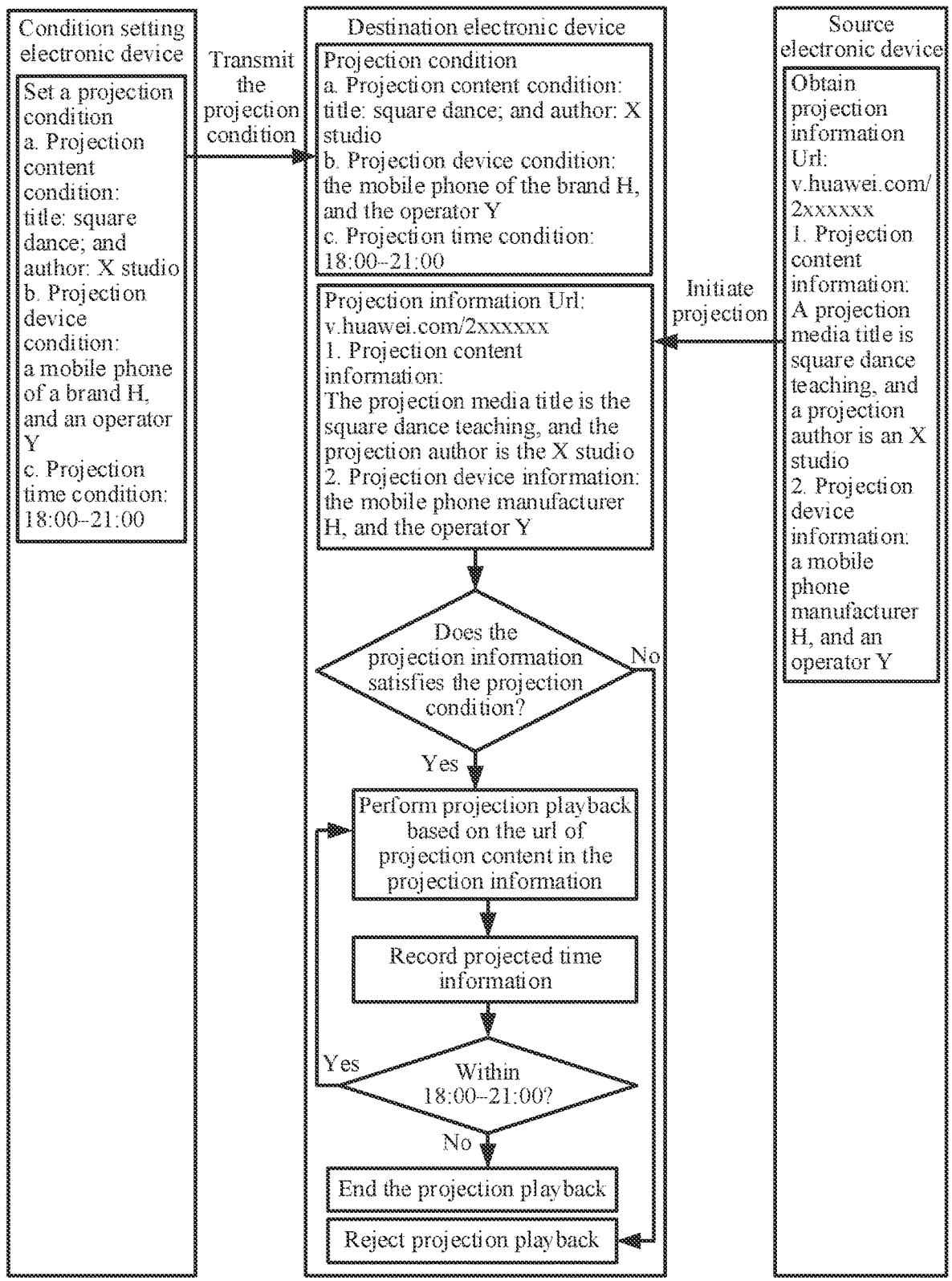
FIG. 10 is a schematic diagram of projection in a public place such as a park according to an embodiment of this application.

When the projection place is a park, as shown in FIG. 10, a condition setting electronic device sets a projection condition by using an application (APP) installed on the condition setting electronic device. The projection condition may include the following: a, a projection content condition: a title: a square dance; and an author: an X studio; b, a projection device condition: a mobile phone of a brand H, and an operator Y; and c, a projection time condition: 18:00-21:00. The condition setting electronic device transmits the projection condition to a destination electronic device. The destination electronic device stores the projection condition. A source electronic device obtains projection information based on currently displayed multimedia content. The projection information may include the following: A url of projection content is: v.huawei.com/2xxxxxx, a projection media title is square dance teaching, a projection author is an X studio, and projection device information may be: a mobile phone manufacturer H, and an operator Y. The source electronic device sends a projection instruction to the destination electronic device based on the projection information. The projection instruction includes the projection information. The destination electronic device compares the projection information with the projection condition. If it is determined that projection content information "a projection media title is square dance teaching, and a projection author is an X studio" matches the projection content condition "a title: a square dance; and an author: an X studio", the projection device information "a mobile phone manufacturer H, and an operator Y" matches the projection device condition "a mobile phone manufacturer H, and an operator Y", and projection time information matches the projection time condition "18:00-21:00", the destination electronic device determines that the projection information satisfies the projection condition "18:00-21:00". The destination electronic device performs projection playback based on the url of the projection content in the projection information. The destination electronic device further records projected time information including projection time point information, and determines, based on the projected time information, whether the projected time information is within the projection time condition "18:00-21:00". If the projected time information is within the projection time condition "18:00-21:00", the destination electronic device continues to perform projection playback. If the projected time information is not within the projection time condition "18:00-21:00", the destination electronic device ends the projection playback.

The foregoing application scenario in which projection is performed in the park is merely a description of the projection method during an actual application. The projection method may be further used in another application scenario based on an actual requirement, for example, a scenario in which only projection playback of an advertisement/introduction video of a related subject can be performed, such as a restaurant, an exhibition hall, or a museum, or a scenario in which there is a time limit on projection playback, such as a child/an adolescent mode or a timing payment mode. A specific implementation process in another application scenario is similar to the application scenario in which projection is performed in the park. Details are not described herein again.

Figure 11A:
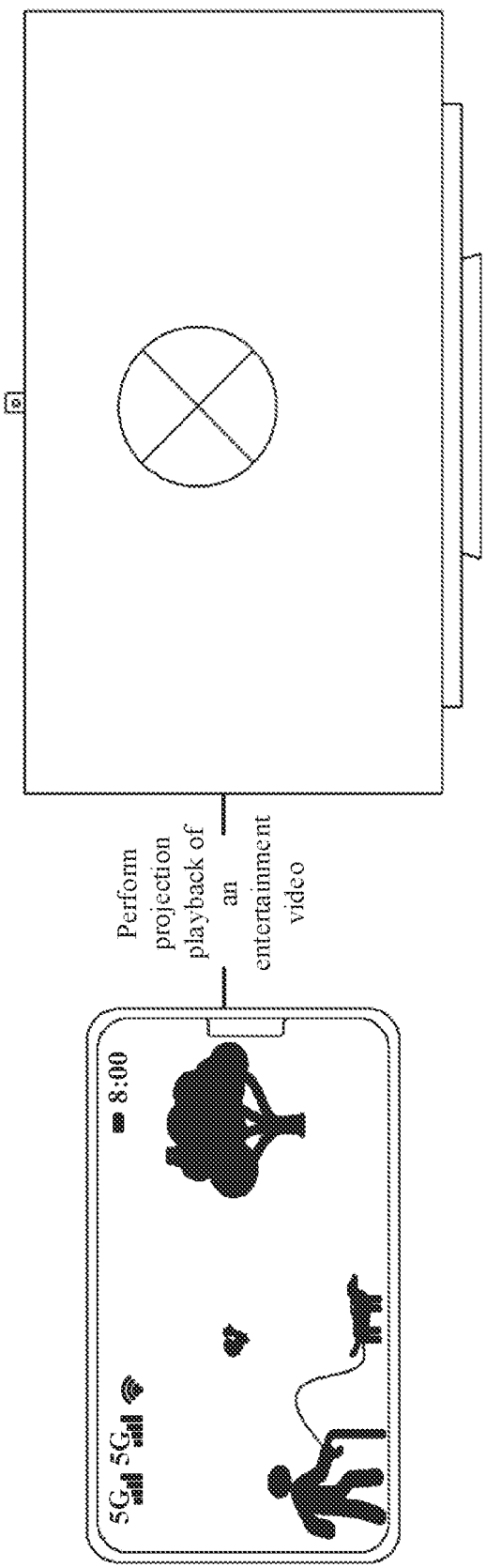
FIG. 11A and FIG. 11B are schematic diagrams of projection effect of projection content according to an embodiment of this application.
Figure 11B:
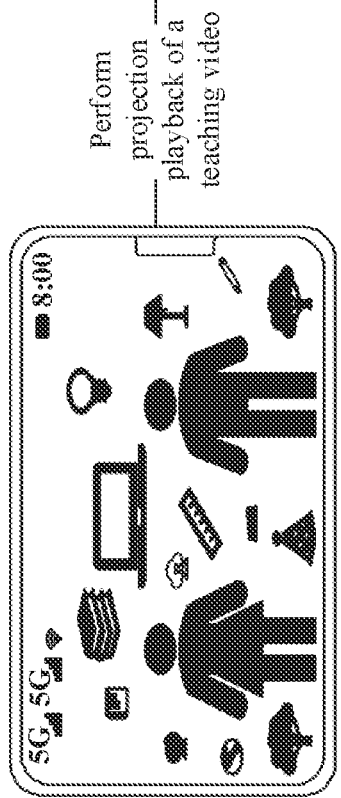
Figure 11B:
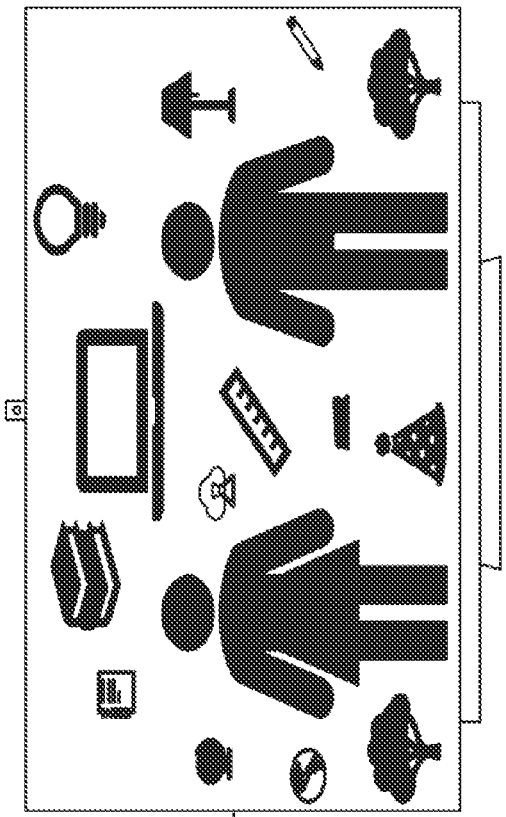

According to the projection method in this embodiment of this application, the projection content, the projection time, and the projection device may be controlled. For example, as shown in FIG. 11A and FIG. 11B, projection content of a classroom place in multimedia teaching may be controlled by using the projection method. As shown in FIG. 11A, in the classroom place in the multimedia teaching, a source electronic device sends an entertainment video to a destination electronic device, and the destination electronic device does not play the video. It may be understood that FIG. 11A merely shows an example in which the destination electronic device does not play the video. Content and a form displayed when the destination electronic device does not play the video are not limited in this application. As shown in FIG. 11B, in the classroom place in the multimedia teaching, a source electronic device sends a teaching video to a destination electronic device, and the destination electronic device performs projection playback of the teaching video.

Figure 12A:
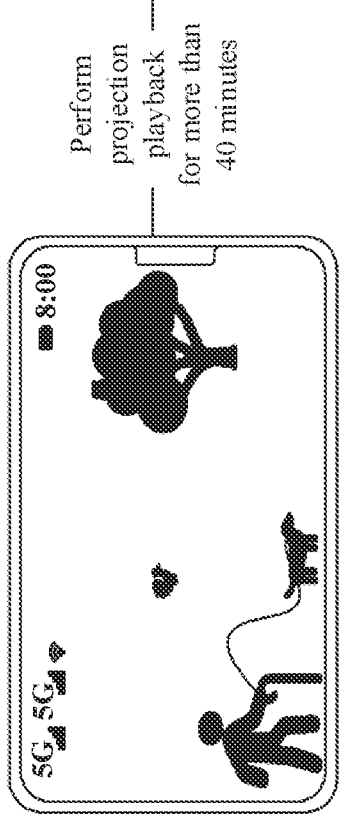
FIG. 12A and FIG. 12B are schematic diagrams of projection effect of projection time according to an embodiment of this application.
Figure 12A:
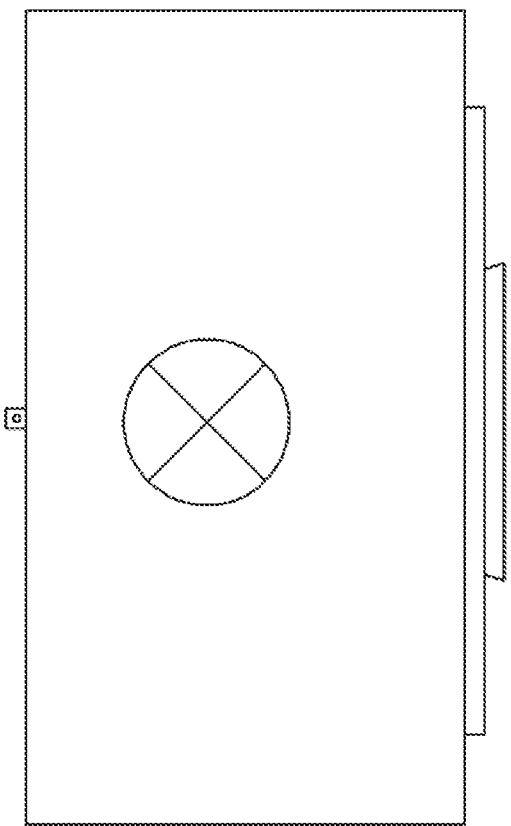
Figure 12B:
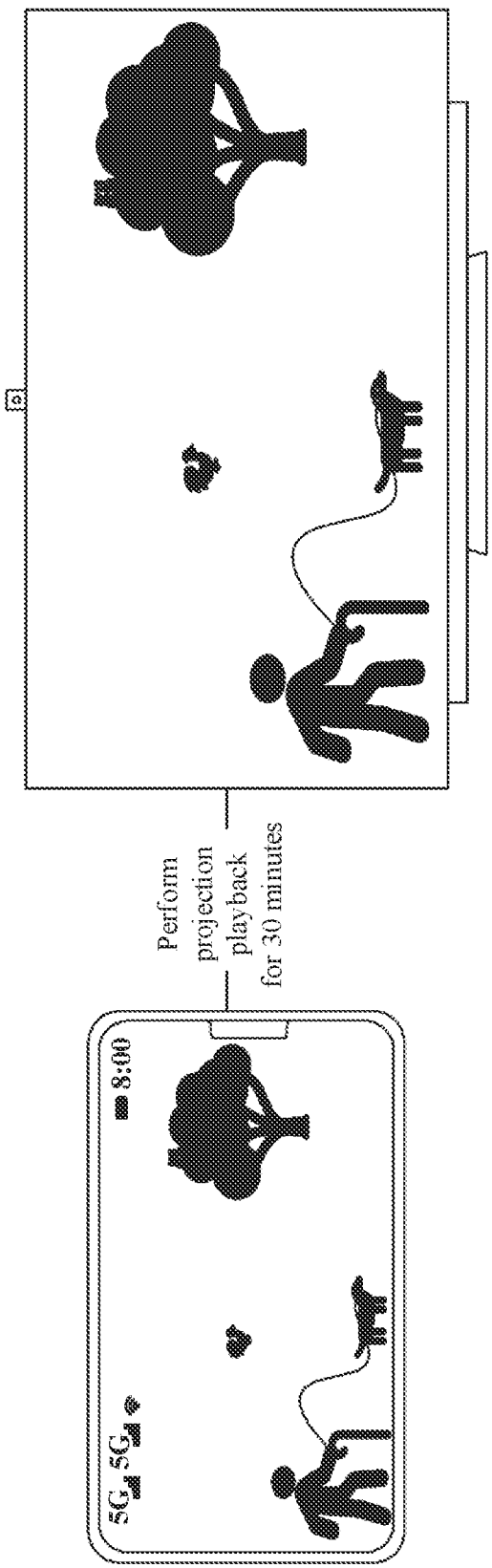

For example, as shown in FIG. 12A and FIG. 12B, projection time of a child/an adolescent mode may be controlled by using the projection method. In the children/adolescent mode, the projection time does not exceed 40 minutes. As shown in FIG. 12A, in the child/adolescent mode, if a source electronic device performs projection playback on a destination electronic device for more than 40 minutes, the destination electronic device ends the projection playback. It may be understood that FIG. 12A merely shows an example in which the destination electronic device ends the projection playback. Content and a form displayed when the destination electronic device ends the projection playback are not limited in this application. As shown in FIG. 12B, in the child/adolescent mode, if a source electronic device performs projection playback on a destination electronic device for no more than 40 minutes, the destination electronic device continues to perform projection playback.

Figure 13:
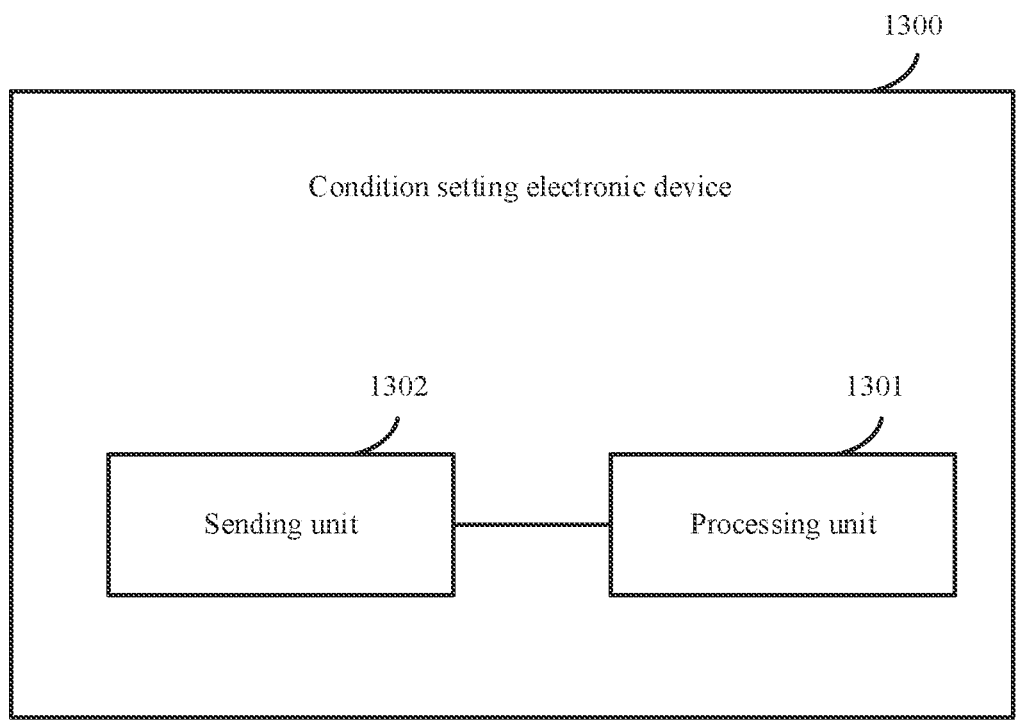
FIG. 13 is a schematic diagram of a logical structure of a condition setting electronic device according to an embodiment of this application.

FIG. 13 is a schematic diagram of a logical structure of a condition setting electronic device according to an embodiment of this application A condition setting electronic device 1300 includes a processing unit 1301 and a sending unit 1302. The processing unit 1301 is configured to: set a projection condition, where the projection condition is set based on at least one of the following: a projection place, a projection user group, and a projection mode, the projection condition includes at least two of the following: a projection content condition, a projection device condition, and a projection time condition, the projection content condition includes at least one of the following: a type of projection content, an author of the projection content, and a title of the projection content, and the projection time condition includes at least one of the following: projection forbidden time and projection allowed time. The sending unit 1302 is configured to send the projection condition to a destination electronic device, so that the destination electronic device implements projection playback.

Figure 14:
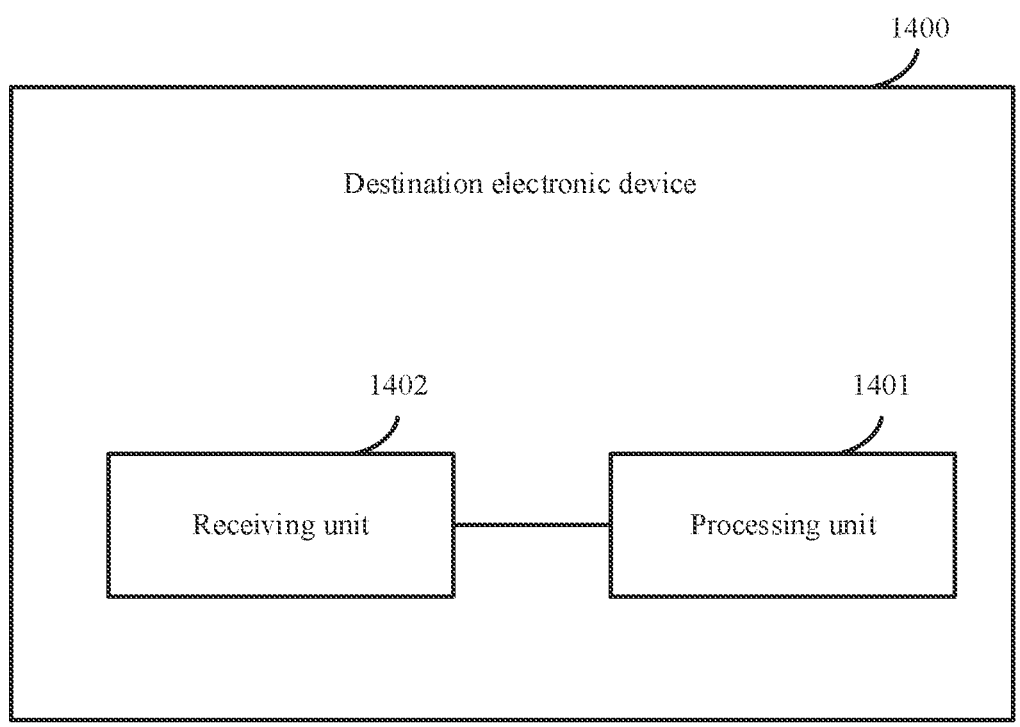
FIG. 14 is a schematic diagram of a logical structure of a destination electronic device according to an embodiment of this application.

FIG. 14 is a schematic diagram of a logical structure of a destination electronic device according to an embodiment of this application. A destination electronic device 1400 includes a processing unit 1401 and a receiving unit 1402. The processing unit 1401 is configured to: obtain a projection condition, where the projection condition is set based on at least one of the following: a projection place, a projection user group, and a projection mode, the projection condition includes at least two of the following: a projection content condition, a projection device condition, and a projection time condition, the projection content condition includes at least one of the following: a type of projection content, an author of the projection content, and a title of the projection content, and the projection time condition includes at least one of the following: projection forbidden time and projection allowed time. The receiving unit 1402 is configured to: receive a projection instruction, where the projection instruction is used to request to project, to the destination electronic device, multimedia content currently displayed by a source electronic device, the projection instruction includes projection information, the projection information includes a uniform resource locator of the projection content, and the projection information further includes at least two of the following: projection content information, projection device information, and projection time information. The processing unit 1401 is further configured to: if the projection information satisfies the projection condition, perform projection playback based on the uniform resource locator of the projection content in the projection information.

In some embodiments, the processing unit 1401 is further configured to: if the projection information does not satisfy the projection condition, reject projection playback.

In some embodiments, the projection condition is obtained in one or more of the following ways: being received from a condition setting electronic device and being determined in response to an operation on the destination electronic device.

In some embodiments, the processing unit 1401 is further configured to record projected time information; and the processing unit 1401 is further configured to: if the projected time information satisfies the projection time condition, continue to perform projection playback based on the uniform resource locator of the projection content in the projection information.

In some embodiments, the processing unit 1401 is further configured to: if the projected time information does not satisfy the projection time condition, end the projection playback.

In some embodiments, the projected time information includes at least one of the following: projection duration information and projection time point information, and the projection duration information includes current-round projection duration information or total current-day projection duration information; and the projection time condition includes at least one of the following: a projection duration condition and a projection time interval condition.

In some embodiments, the projection place includes a multimedia teaching place; and the projection condition includes a projection content condition in which the type of the projection content is a teaching type.

In some embodiments, the projection place includes at least one of the following: a public accommodation place, a catering place, and a public cultural place; and the projection condition includes a projection content condition in which the title of the projection content is an advertisement or an introduction of a related subject of a place.

In some embodiments, the projection place includes a public leisure place, and the projection user group includes middle-aged and aged persons; and the projection condition includes a projection content condition in which the title of the projection content is a square dance related to fitness.

In some embodiments, the projection mode includes at least one of the following: a child/an adolescent mode and a timing payment mode; and the projection condition includes at least one projection time condition of the following: projection duration being less than preset duration, a time point being within a preset range, and a time point being not within a preset range.

In some embodiments, the projection time information is a time at which the source electronic device generates the projection instruction, a time at which the source electronic device transmits the projection instruction, a time at which the destination electronic device receives the projection instruction, or a time at which the destination electronic device responds to the projection instruction.

In addition to the foregoing method and devices, an embodiment of this application further provides a computer-readable storage medium. The computer-readable storage medium stores a program, and the program enables a computer device to perform the projection method shown in FIG. 3.

A computer program product is provided. The computer program product includes computer-executable instructions, the computer-executable instructions are stored in a computer-readable storage medium, at least one processor of a device reads the computer-executable instructions from the computer-readable storage medium, and the at least one processor executes the computer-executable instructions, to enable the device to perform the projection method shown in FIG. 3.

In this application, the projection condition may be set based on at least one of the following: the projection place, the projection user group, and the projection mode, and at least two of the following may be controlled: the projection content, the projection device, and projection time, so that the content or the time or both of projection satisfy a current projection scenario.

Based on the foregoing descriptions of the implementations, a person skilled in the art may clearly understand that for the purpose of convenient and brief descriptions, division of the foregoing functional modules is merely used as an example for description. During actual application, the foregoing functions can be allocated to different functional modules for implementation based on a requirement, that is, an inner structure of an apparatus is divided into different functional modules, to implement all or some of the foregoing described functions.

In several embodiments provided in this application, it should be understood that the disclosed apparatus and method may be implemented in another manner. For example, the foregoing described apparatus embodiment is merely an example. For example, division of the modules or units is merely logical function division and may be other division during actual implementation. For example, a plurality of units or components may be combined or integrated into another apparatus, or some features may be ignored or not performed.

In addition, functional units in embodiments of this application may be integrated into one processing unit, each of the units may exist alone physically, or two or more units may be integrated into one unit. The foregoing integrated unit may be implemented in a form of hardware, or may be implemented in a form of a software functional unit.

Finally, it should be noted that the foregoing embodiments are merely intended for describing the technical solutions of this application, but not for limiting the technical solutions of this application. Although this application is described in detail with reference to example embodiments, a person of ordinary skill in the art should understand that modifications or equivalent replacements may be made to the technical solutions of this application, without departing from the spirit and scope of the technical solutions of this application.

What is claimed is:

1. A projection method, applied to a destination electronic device, wherein the projection method comprises:
obtaining a projection condition that is based on at least one of a projection place, a projection user group, or a projection mode, wherein the projection condition comprises at least two of a projection content condition, a projection device condition, or a projection time condition, wherein the projection content condition comprises at least one of a type of projection content, an author of the projection content, or a title of the projection content, and wherein the projection time condition comprises at least one of a projection forbidden time or a projection allowed time;
receiving a projection instruction, wherein the projection instruction instructs to project, on the destination electronic device, multimedia content currently displayed by a source electronic device, wherein the projection instruction comprises projection information, wherein the projection information comprises a uniform resource locator (URL) of the projection content, wherein the projection information further comprises projection time information and at least one of projection content information or projection device information, and wherein the projection time information is a first time at which the source electronic device generates the projection instruction, a second time at which the source electronic device transmits the projection instruction, a third time at which the destination electronic device receives the projection instruction, or a fourth time at which the destination electronic device responds to the projection instruction; and
performing, when the projection information satisfies the projection condition, projection playback based on the URL.

2. The projection method of claim 1, further comprising rejecting, when the projection information does not satisfy the projection condition, the projection playback.

3. The projection method of claim 1, further comprising obtaining the projection condition by receiving the projection condition from a condition setting electronic device or determining the projection condition in response to an operation on the destination electronic device.

4. The projection method of claim 1, wherein after performing the projection playback based on the URL, the method further comprises:
 recording the projected time information; and
 continuing to perform, when the projected time information satisfies the projection time condition, the projection playback based on the URL.

5. The projection method of claim 4, further comprising ending, when the projected time information does not satisfy the projection time condition, the projection playback.

6. The projection method of claim 4, wherein the projected time information comprises at least one of projection duration information or projection time point information, wherein the projection duration information comprises current-round projection duration information or total current-day projection duration information, and wherein the projection time condition comprises at least one of a projection duration condition or a projection time interval condition.

7. The projection method of claim 1, wherein the projection place comprises a multimedia teaching place, wherein the projection condition comprises the projection content condition, wherein the projection content condition comprises the type, and wherein the type is a teaching type.

8. The projection method of claim 1, wherein the projection place comprises at least one of a public accommodation place, a catering place, or a public cultural place, wherein the projection condition comprises the projection content condition, wherein the projection content condition comprises the title, and wherein the title is an advertisement or an introduction of a related subject of a place.

9. A destination electronic device comprising:
 one or more processors configured to obtain a projection condition that is based on at least one of a projection place, a projection user group, or a projection mode, wherein the projection condition comprises at least two of a projection content condition, a projection device condition, or a projection time condition, wherein the projection content condition comprises at least one of a type of projection content, an author of the projection content, or a title of the projection content, and wherein the projection time condition comprises at least one of a projection forbidden time or a projection allowed time; and
 a receiver coupled to the one or more processors and configured to receive a projection instruction instructing to project, on the destination electronic device, multimedia content currently displayed by a source electronic device, wherein the projection instruction comprises projection information, wherein the projection information comprises a uniform resource locator (URL) of the projection content, wherein the projection information further comprises projection time information and at least one of projection content information and projection device information, wherein the projection time information is a first time at which the source electronic device generates the projection instruction, a second time at which the source electronic device transmits the projection instruction, a third time at which the destination electronic device receives the projection instruction, or a fourth time at which the destination electronic device responds to the projection instruction, and
 wherein the one or more processors are further configured to perform, when the projection information satisfies the projection condition, projection playback based on the URL.

10. The destination electronic device of claim 9, wherein the one or more processors are further configured to reject, when the projection information does not satisfy the projection condition, the projection playback.

11. The destination electronic device of claim 9, wherein the receiver is configured to receive the projection condition from a condition setting electronic device, or wherein the one or more processors are configured to determine the project condition in response to an operation on the destination electronic device.

12. The destination electronic device of claim 9, wherein the one or more processors are further configured to:
 record projected time information; and
 continue to perform, when the projected time information satisfies the projection time condition, the projection playback based on the URL.

13. The destination electronic device of claim 12, wherein the one or more processors are further configured to end, when the projected time information does not satisfy the projection time condition, the projection playback.

14. The destination electronic device of claim 12, wherein the projected time information comprises at least one of projection duration information or projection time point information, wherein the projection duration information comprises current-round projection duration information or total current-day projection duration information, and wherein the projection time condition comprises at least one of a projection duration condition or a projection time interval condition.

15. The destination electronic device of claim 9, wherein the projection place comprises a multimedia teaching place, wherein the projection condition comprises the projection content condition, wherein the projection content condition comprises the type, and wherein the type is a teaching type.

16. The destination electronic device of claim 9, wherein the projection place comprises at least one of a public accommodation place, a catering place, or a public cultural place, wherein the projection condition comprises the projection content condition, wherein the projection content condition comprises the title, and wherein the title is an advertisement or an introduction of a related subject of a place.

17. A projection method, applied to a destination electronic device, wherein the projection method comprises:
 obtaining a projection condition that is based on a projection place and at least one of a projection user group or a projection mode, wherein the projection place comprises at least one of a public accommodation place, a catering place, or a public cultural place, wherein the projection condition comprises a projection content condition and at least one of a projection device condition or a projection time condition, wherein the projection content condition comprises a title of projection content and at least one of a type of the projection content or an author of the projection content, wherein the title is an advertisement or an introduction of a related subject of a place, and wherein the projection time condition comprises at least one of a projection forbidden time or a projection allowed time;

receiving a projection instruction, wherein the projection instruction instructs to project, on the destination electronic device, multimedia content currently displayed by a source electronic device, wherein the projection instruction comprises projection information, wherein the projection information comprises a uniform resource locator (URL) of the projection content, and wherein the projection information further comprises at least two of projection content information, projection device information, or projection time information; and performing, when the projection information satisfies the projection condition, projection playback based on the URL.

18. The projection method of claim 17, wherein the projection forbidden time is a first time period in which performing the projection playback is forbidden for at least one of a first device of a specified operator or a second device of a specified manufacturer, and wherein the projection allowed time is a second time period in which performing the projection playback is allowed for the at least one of the first device or the second device.

19. A destination electronic device comprising:

one or more processors configured to obtain a projection condition that is based on a projection place and at least one of a projection user group or a projection mode, wherein the projection place comprises at least one of a public accommodation place, a catering place, or a public cultural place, wherein the projection condition comprises a projection content condition and at least one of a projection device condition or a projection time condition, wherein the projection content condition comprises a title of projection content and at least one of a type of the projection content or an author of the projection content, wherein the title is an advertisement or an introduction of a related subject of a place, and wherein the projection time condition comprises at least one of a projection forbidden time or a projection allowed time; and a receiver coupled to the one or more processors and configured to receive a projection instruction instructing to project, on the destination electronic device, multimedia content currently displayed by a source electronic device, wherein the projection instruction comprises projection information, wherein the projection information comprises a uniform resource locator (URL) of the projection content, wherein the projection information further comprises at least two of projection content information, projection device information, or projection time information, and wherein the one or more processors are further configured to perform, when the projection information satisfies the projection condition, projection playback based on the URL.

20. The destination electronic device of claim 19, wherein the projection forbidden time is a first time period in which performing the projection playback is forbidden for at least one of a first device of a specified operator or a second device of a specified manufacturer, and wherein the projection allowed time is a second time period in which performing the projection playback is allowed for the at least one of the first device or the second device.

* * * * *